(12) United States Patent
Miyatani et al.

(10) Patent No.: US 10,059,002 B2
(45) Date of Patent: Aug. 28, 2018

(54) IMAGE PROCESSING APPARATUS, IMAGE PROCESSING METHOD, AND NON-TRANSITORY COMPUTER-READABLE MEDIUM

(71) Applicant: CANON KABUSHIKI KAISHA, Tokyo (JP)

(72) Inventors: Sonoko Miyatani, Tokyo (JP); Tatsuya Suzuki, Tokyo (JP); Masakazu Fujiki, Kawasaki (JP); Kazuhiko Kobayashi, Yokohama (JP); Masahiro Suzuki, Kawasaki (JP); Yuichiro Hirota, Tokyo (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 14/949,136

(22) Filed: Nov. 23, 2015

(65) Prior Publication Data
US 2016/0155235 A1 Jun. 2, 2016

(30) Foreign Application Priority Data
Nov. 28, 2014 (JP) .................. 2014-242301

(51) Int. Cl.
*G06K 9/00* (2006.01)
*G06K 9/40* (2006.01)
(Continued)

(52) U.S. Cl.
CPC ........... *B25J 9/1697* (2013.01); *G06K 9/036* (2013.01); *G06K 9/4609* (2013.01);
(Continued)

(58) Field of Classification Search
None
See application file for complete search history.

(56) References Cited

U.S. PATENT DOCUMENTS

2010/0098338 A1  4/2010  Kido
2016/0203367 A1* 7/2016  Oami ................. G06K 9/00711
                                                    382/103

FOREIGN PATENT DOCUMENTS

CN    101102399 A    1/2008
CN    102246505 A    11/2011

OTHER PUBLICATIONS

Drummond et al., "Real-time visual tracking of complex structures", IEEE Transactions on Pattern Analysis and Machine Intelligence, vol. 24, No. 7, 2002, pp. 932-946.
(Continued)

*Primary Examiner* — Sean Conner
(74) *Attorney, Agent, or Firm* — Carter, Deluca, Farrell & Schmidt, LLP

(57) ABSTRACT

There is provided with an image processing apparatus. A captured image of a target object that is captured by an image capturing apparatus is obtained. Information that indicates a deterioration degree of the captured image is obtained for a position in the captured image. A feature of the target object is extracted from the captured image based on the deterioration degree. The feature of the target object and a feature of the three-dimensional model observed when the three-dimensional model is arranged in accordance with a predetermined position and orientation are associated. A position and orientation of the target object with respect to the image capturing apparatus are derived by correcting the predetermined position and orientation based on a result of association.

19 Claims, 10 Drawing Sheets

(51) Int. Cl.
| | |
|---|---|
| *B25J 9/16* | (2006.01) |
| *G06K 9/03* | (2006.01) |
| *G06K 9/46* | (2006.01) |
| *G06K 9/62* | (2006.01) |
| *G06T 7/521* | (2017.01) |

(52) U.S. Cl.
CPC ............ *G06K 9/6215* (2013.01); *G06T 7/521* (2017.01); *G06T 2207/30164* (2013.01); *Y10S 901/09* (2013.01)

(56) References Cited

OTHER PUBLICATIONS

Hiroto et al., "Coarse Position/Orientation Detection of Bulk Parts Using Ensemble Classification Tree", Image Recognition and Understanding Symposium (MIRU2010), Jul. 2010, pp. 778-782.
Tsai, "A versatile camera calibration technique for high-accuracy 3D machine vision metrology using off-the-shelf TV cameras and lenses", IEEE Journal of Robotics and Automation, vol. RA-3, No. 4, 1987, pp. 323-344.
Lepetit et al., "Keypoint recognition using randomized trees", IEEE Transactions on Pattern Analysis and Machine Intelligence, vol. 28, No. 9, 2006, pp. 1-27.
Tanaka, "Introduction of Image Processing Techniques by Probabilistic Models", Chapter 6, Sep. 2006, pp. 67-71.
Fujiyoshi, "Local Feature Amounts for Generic Object Recognition (SIFT and HOG)" Information Processing Institute Research Report, CVIM 160, 2007, pp. 211-224.
Chinese Office Action for application No. 201510821654.5 dated Feb. 24, 2018 with English Translation (21 pages).

\* cited by examiner

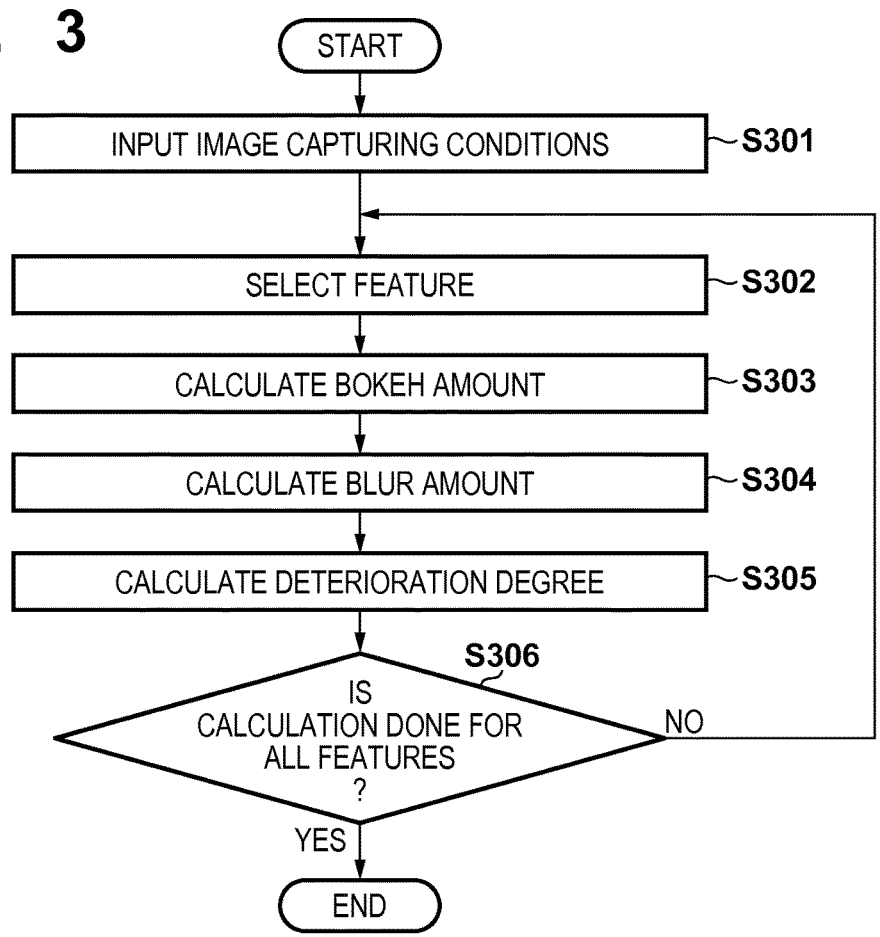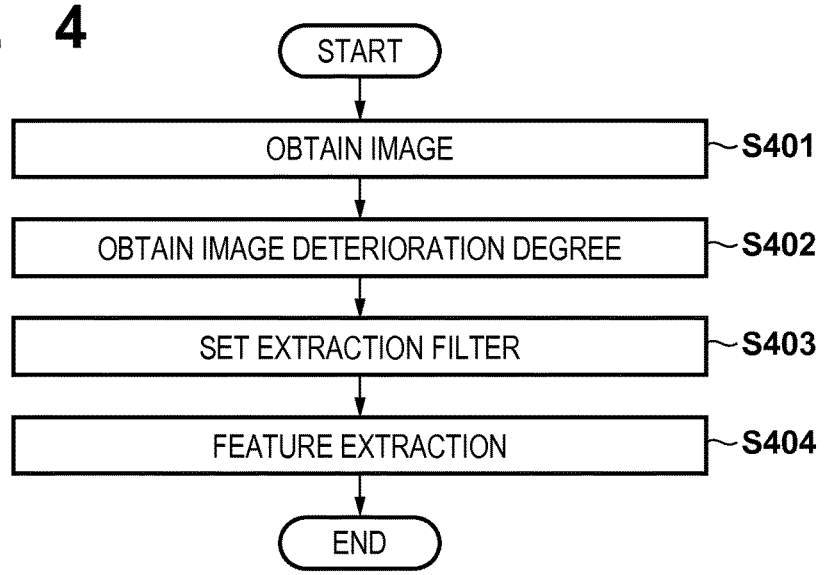

IMAGE PROCESSING APPARATUS, IMAGE PROCESSING METHOD, AND NON-TRANSITORY COMPUTER-READABLE MEDIUM

BACKGROUND OF THE INVENTION

Field of the Invention

The present invention relates to an image processing apparatus, an image processing method, and a non-transitory computer-readable medium.

Description of the Related Art

With the development of robot technology in recent years, complicated tasks that thus far people have performed, such as assembling an industrial product, are in the process of coming to be performed instead by robots. To perform assembling, such a robot grips a component by using an end effector such as a hand. For the robot to grip the component, there is a need to measure a relative position and orientation (hereinafter, simply referred to as position and orientation) between the component that is a target of gripping and the robot (hand). Measurement of such position and orientation can additionally be applied to various objectives, such as self-position estimation for the robot to autonomously move, or alignment between a virtual object and a physical space (a physical object) in augmented reality.

As a method of measuring the position and orientation of an object, T. Drummond and R. Cipolla, "Real-time visual tracking of complex structures", IEEE Transactions on Pattern Analysis and Machine Intelligence, vol. 24, no. 7, pp. 932-946, 2002 discloses a method of causing a projection image of a three-dimensional model of an object represented by a collection of line segments to match an edge feature on an image obtained by an image capturing apparatus. Specifically, based on a coarse position and orientation provided as known information, a line segment in a three-dimensional model is projected onto an image. Next, edge features corresponding to each control point discretely arranged on the projected line segment are detected from the image. Then final position and orientation measurement values are obtained by correcting the coarse position and orientation so that a sum of squares of distances on the image between the projection image of the line segment to which the control points belong and corresponding edge features is a minimum.

SUMMARY OF THE INVENTION

According to an embodiment of the present invention, an image processing apparatus comprises: an image obtaining unit configured to obtain a captured image of a target object that is captured by an image capturing apparatus; a deterioration degree obtaining unit configured to obtain information that indicates a deterioration degree of the captured image, for a position in the captured image; an extraction unit configured to extract a feature of the target object from the captured image based on the deterioration degree; a model holding unit configured to hold a three-dimensional model of the target object; an associating unit configured to associate the feature of the target object and a feature of the three-dimensional model observed when the three-dimensional model is arranged in accordance with a predetermined position and orientation; and a deriving unit configured to derive a position and orientation of the target object with respect to the image capturing apparatus by correcting the predetermined position and orientation based on a result of association.

According to another embodiment of the present invention, an image processing apparatus comprises: an image obtaining unit configured to obtain a captured image of a target object that is captured by an image capturing apparatus; a deterioration degree obtaining unit configured to obtain information that indicates a deterioration degree of the captured image for a position in the captured image; a holding unit configured to hold a plurality of comparison target images; and a determination unit configured to determine, from a plurality of the comparison target images, an image that corresponds to an image of the target object, based on a degree of matching between the image of the target object and comparison target images from the plurality of the comparison target images, wherein the degree of matching is based on a difference with a corresponding feature of a comparison target image for each of a plurality of features of the image of the target object, which is weighted in accordance with the deterioration degree corresponding to a position at which the feature is extracted.

According to still another embodiment of the present invention, an image processing apparatus comprises: an image obtaining unit configured to obtain a captured image of a target object that is captured by an image capturing apparatus; a deterioration degree obtaining unit configured to obtain information that indicates a deterioration degree of the captured image; a setting unit configured to set an extraction parameter used to extract a feature from the captured image in accordance with the deterioration degree; and an extraction unit configured to extract a feature of the captured image by using the extraction parameter set by the setting unit with reference to the captured image.

According to yet another embodiment of the present invention, an image processing method comprises: obtaining a captured image of a target object that is captured by an image capturing apparatus; obtaining information that indicates a deterioration degree of the captured image, for a position in the captured image; extracting a feature of the target object from the captured image based on the deterioration degree; holding a three-dimensional model of the target object; associating the feature of the target object and a feature of the three-dimensional model observed when the three-dimensional model is arranged in accordance with a predetermined position and orientation; and deriving a position and orientation of the target object with respect to the image capturing apparatus by correcting the predetermined position and orientation based on a result of the associating.

According to still yet another embodiment of the present invention, an image processing method comprises: obtaining a captured image of a target object that is captured by an image capturing apparatus; obtaining information that indicates a deterioration degree of the captured image for a position in the captured image; holding a plurality of comparison target images; and determining, from a plurality of the comparison target images, an image that corresponds to an image of the target object, based on a degree of matching between the image of the target object and comparison target images from the plurality of the comparison target images, wherein the degree of matching is based on a difference with a corresponding feature of a comparison target image for each of a plurality of features of the image of the target object, which is weighted in accordance with the deterioration degree corresponding to a position at which the feature is extracted.

According to yet still another embodiment of the present invention, an image processing method comprises: obtaining a captured image of a target object that is captured by an image capturing apparatus; obtaining information that indicates a deterioration degree of the captured image; setting an extraction parameter used to extract a feature from the captured image in accordance with the deterioration degree; and extracting a feature of the captured image by using the extraction parameter with reference to the captured image.

According to still yet another embodiment of the present invention, a non-transitory computer-readable medium stores a program thereon, wherein the program is configured to cause a computer to: obtain a captured image of a target object that is captured by an image capturing apparatus; obtain information that indicates a deterioration degree of the captured image, for a position in the captured image; extract a feature of the target object from the captured image based on the deterioration degree; hold a three-dimensional model of the target object; associate the feature of the target object and a feature of the three-dimensional model observed when the three-dimensional model is arranged in accordance with a predetermined position and orientation; and derive a position and orientation of the target object with respect to the image capturing apparatus by correcting the predetermined position and orientation based on a result of association.

According to yet still another embodiment of the present invention, a non-transitory computer-readable medium stores a program thereon, wherein the program is configured to cause a computer to: obtain a captured image of a target object that is captured by an image capturing apparatus; obtain information that indicates a deterioration degree of the captured image for a position in the captured image; hold a plurality of comparison target images; and determine, from a plurality of the comparison target images, an image that corresponds to an image of the target object, based on a degree of matching between the image of the target object and comparison target images from the plurality of the comparison target images, wherein the degree of matching is based on a difference with a corresponding feature of a comparison target image for each of a plurality of features of the image of the target object, which is weighted in accordance with the deterioration degree corresponding to a position at which the feature is extracted.

According to still yet another embodiment of the present invention, a non-transitory computer-readable medium stores a program thereon, wherein the program is configured to cause a computer to: obtain a captured image of a target object that is captured by an image capturing apparatus; obtain information that indicates a deterioration degree of the captured image; set an extraction parameter used to extract a feature from the captured image in accordance with the deterioration degree; and extract a feature of the captured image by using the extraction parameter with reference to the captured image.

According to yet still another embodiment of the present invention, an image processing apparatus comprises: an image obtaining unit configured to obtain a captured image of a target object that is captured by an image capturing apparatus; a deterioration degree obtaining unit configured to obtain information that indicates a deterioration degree of the captured image, for a position in the captured image; an extraction unit configured to extract a feature of the target object from the captured image; a model holding unit configured to hold a three-dimensional model of the target object; an associating unit configured to associate the feature of the target object and a feature of the three-dimensional model observed when the three-dimensional model is arranged in accordance with a predetermined position and orientation; and a deriving unit configured to derive a position and orientation of the target object with respect to the image capturing apparatus by correcting the predetermined position and orientation based on a result of association and the deterioration degree corresponding to a position at which the feature was extracted.

According to still yet another embodiment of the present invention, an image processing method comprises: obtaining a captured image of a target object that is captured by an image capturing apparatus; obtaining information that indicates a deterioration degree of the captured image, for a position in the captured image; extracting a feature of the target object from the captured image; holding a three-dimensional model of the target object; associating the feature of the target object and a feature of the three-dimensional model observed when the three-dimensional model is arranged in accordance with a predetermined position and orientation; and deriving a position and orientation of the target object with respect to the image capturing apparatus by correcting the predetermined position and orientation based on a result of the associating and the deterioration degree corresponding to a position at which the feature was extracted.

According to yet still another embodiment of the present invention, a non-transitory computer-readable medium stores a program thereon, wherein the program is configured to cause a computer to: obtain a captured image of a target object that is captured by an image capturing apparatus; obtain information that indicates a deterioration degree of the captured image, for a position in the captured image; extract a feature of the target object from the captured image; hold a three-dimensional model of the target object; associate the feature of the target object and a feature of the three-dimensional model observed when the three-dimensional model is arranged in accordance with a predetermined position and orientation; and derive a position and orientation of the target object with respect to the image capturing apparatus by correcting the predetermined position and orientation based on a result of association and the deterioration degree corresponding to a position at which the feature was extracted.

Further features of the present invention will become apparent from the following description of exemplary embodiments (with reference to the attached drawings).

BRIEF DESCRIPTION OF THE DRAWINGS

FIG. 3 is a flowchart of deterioration degree calculation processing according to the first embodiment.

FIG. 4 is a flowchart of feature extraction processing according to the first embodiment.

DESCRIPTION OF THE EMBODIMENTS

Figure 1:
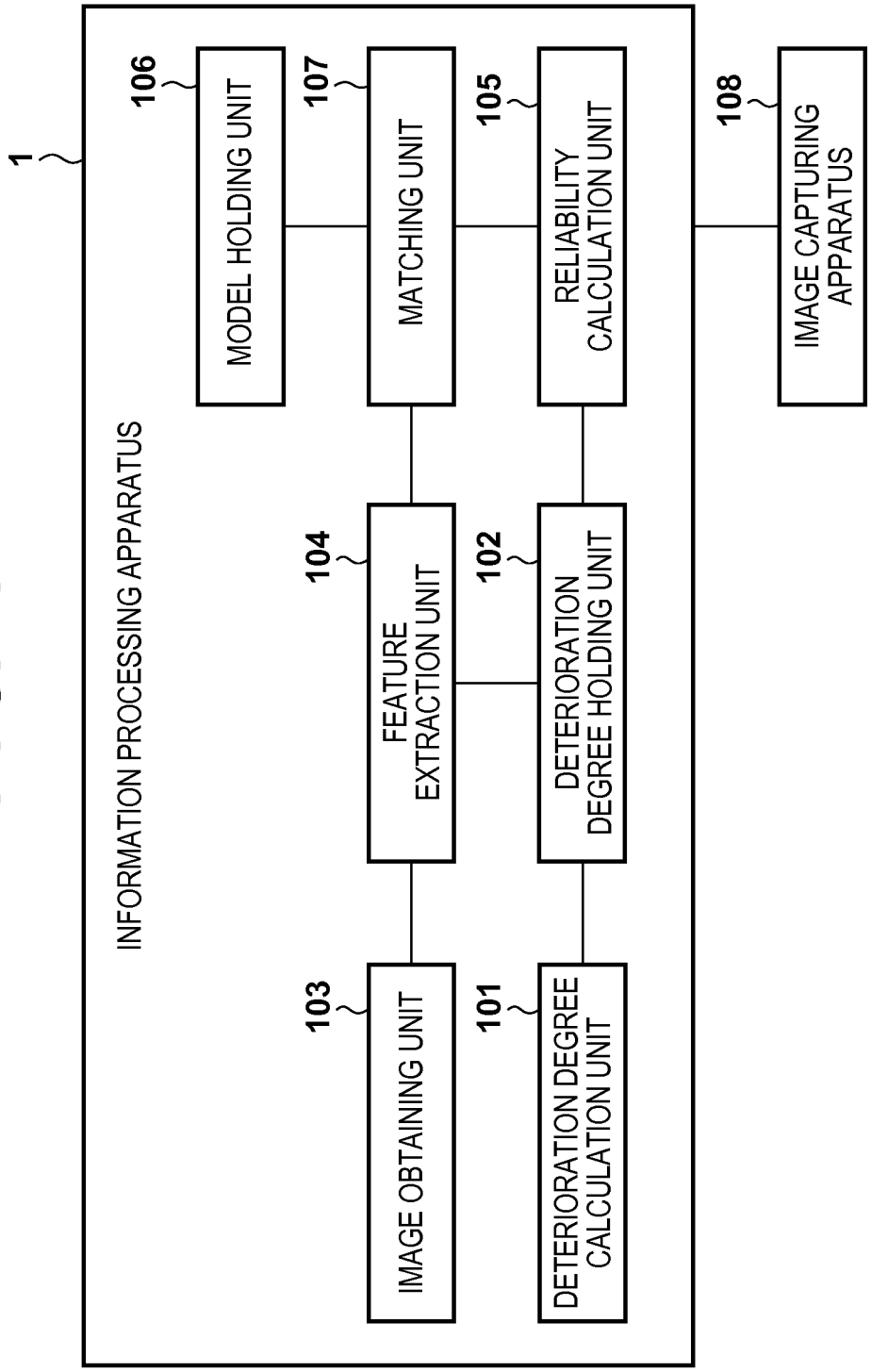
FIG. 1 is a view showing a configuration of an information processing apparatus 1 according to the first embodiment.

In the method recited in Drummond and Cipolla, if degradation in an image caused by an image blur, bokeh, or the like occurs, there is a problem in that precision of measurement of the position and orientation degrades. This can be considered to be because a position of an edge feature extracted from the image shifts from the original position of the edge feature when the image is degraded.

According to an embodiment of the present invention, it is possible to improve measurement precision when degradation in a captured image of an object occurs in a case when the captured image is used to measure the position and orientation of the object.

Explanation is given below of embodiments of the present invention based on the drawings. However, the scope of the present invention is not limited to the following embodiments.

[First Embodiment]

In the first embodiment, an estimation of the position and orientation of a measurement target object is performed considering a deterioration degree of a captured image of the measurement target object. Specifically, when extracting a feature from a captured image, feature extraction is performed at high precision by considering the deterioration degree of the captured image. In addition, when causing a three-dimensional model of the measurement target object to fit to extracted features, weighting in accordance with the deterioration degree of the captured image is performed. Below, the measurement target object is simply called the target object.

Explanation is given below of a case of estimating the position and orientation of the target object based on a captured image captured by the image capturing apparatus. In such a case, the relative position and orientation of the target object with respect to the image capturing apparatus is calculated. In the explanation below, to the extent that it is not described otherwise, the position and orientation of the target object indicate the relative position and orientation of the target object with respect to the image capturing apparatus. Based on the position and orientation of the image capturing apparatus in a coordinate system and the relative position and orientation of the target object with respect to the image capturing apparatus, it is easy to calculate the position and orientation of the target object in this coordinate system. Accordingly, calculating the relative position and orientation of the target object with respect to the image capturing apparatus is equivalent to calculating the position and orientation of the target object in a coordinate system.

The deterioration degree indicates the degree of deterioration of the captured image which is captured by the image capturing apparatus. In this way, when estimating the position and orientation of the target object, it is possible to estimate the position and orientation of the measurement target object with high precision by considering the deterioration degree of the captured image of the target object.

In the present embodiment, the deterioration degree is generated in advance by a deterioration degree holding unit 102 described later, and is held in advance. For example, the deterioration degree is calculated before the captured image of the target object is obtained by an image capturing apparatus 108, or before the captured image of the target object is obtained by an image obtaining unit 103. In the case of the present embodiment, a deterioration degree calculation unit 101 calculates the deterioration degree before the captured image of the target object is obtained by the image obtaining unit 103. According to such a configuration, because processing that calculates the deterioration degree after the image obtaining unit 103 obtains the captured image of the target object can be omitted, it is possible to perform the estimation of the position and orientation of the target object at high speed. In another embodiment, the deterioration degree may be calculated after the captured image of the target object is obtained by the image capturing apparatus 108, or after the captured image of the target object is obtained by the image obtaining unit 103. For example, when the deterioration degree has become necessary in processing of a feature extraction unit 104 or a reliability calculation unit 105, the deterioration degree calculation unit 101 may calculate the deterioration degree in real-time.

In the present embodiment, the deterioration degree according to the relative position and orientation of the target object with respect to the image capturing apparatus is set for each feature (model feature) on the three-dimensional model of the target object. This deterioration degree represents a degree of deterioration of an image of a feature of the target object corresponding to a model feature on the captured image when the target object is captured by the image capturing apparatus. In the present embodiment, a deterioration degree of an image due to bokeh and blur is considered. In other words, the deterioration degree due to bokeh and blur is calculated and held in advance in consideration of image capturing conditions. The image capturing conditions include a relative speed between the target object and the image capturing apparatus, or the like. The image capturing conditions also include an image capturing parameter of the image capturing apparatus, such as an exposure time, a focal position, or an aperture.

Features extracted from the captured image are not particularly limited, but an edge feature is used in the present embodiment. The edge feature is a point that is an extreme value of a luminance gradient which is extracted by applying a differential filter such as a Sobel filter to the captured image. In the present embodiment, to correctly extract the edge feature, a filter in accordance with a bokeh amount and a blur amount is used. In the embodiment, a large size filter is used when the bokeh amount and the blur amount are large, and a small size filter is used when the bokeh amount and the blur amount are small. In addition, in the fitting of an edge feature extracted from the captured image (an image edge feature) and a feature on the three-dimensional model (a model edge feature), a weight of the edge feature is increased to the extent that the deterioration degree is small.

FIG. 1 shows a configuration of an information processing apparatus 1 according to the first embodiment, which is an example of the information processing apparatus according to the present invention. The information processing apparatus 1 comprises the deterioration degree calculation unit 101, the deterioration degree holding unit 102, the image obtaining unit 103, the feature extraction unit 104, the reliability calculation unit 105, a model holding unit 106, and a matching unit 107.

The deterioration degree calculation unit 101 calculates information that indicates an image deterioration degree for each position in the captured image captured by the image capturing apparatus. In the present embodiment, the deterioration degree calculation unit 101 calculates an image deterioration degree at a position of a model edge feature on the captured image for each model edge feature.

In the present embodiment, the deterioration degree calculation unit 101 calculates the bokeh amount and the blur amount on the captured image for each model edge feature as the deterioration degree. In the embodiment, the deterioration degree calculation unit 101 calculates the deterioration degree by a simulation that considers image capturing conditions according to the image capturing apparatus 108 and the three-dimensional model that indicates a three-dimensional shape of the target object. A detailed method of calculating the deterioration degree is described later. In the present embodiment, the deterioration degree calculation unit 101 calculates the bokeh amount and the blur amount as the deterioration degree. The deterioration degree holding unit 102 holds the deterioration degree calculated by the deterioration degree calculation unit 101 for each model edge feature. The deterioration degree is not particularly limited if it indicates the image deterioration degree of the captured image. For example, the deterioration degree may be at least one of the blur amount and the bokeh amount of an image. In addition, a parameter based on the bokeh amount and the blur amount (for example, a $\sigma_0$ described later) may be calculated as the deterioration degree. Furthermore, three or more parameters may be calculated as the deterioration degree.

In the present embodiment, the deterioration degree calculation unit 101 calculates the deterioration degree for each model edge feature that the model holding unit 106 holds position information for. The deterioration degree holding unit 102 holds the deterioration degree for each of the model edge features that the model holding unit 106 holds position information for. For any point on the three-dimensional model, it is possible to calculate the deterioration degree by a similar method.

In the present embodiment, matching of an image of the target object and an image of the comparison target (three-dimensional model image) is performed as will be explained later. If matching is good, for example in the final stage of optimization, it can be considered that the image of the target object is approximate to the image of the comparison target. Accordingly, it can be considered that the deterioration degree of the image at the position of a model edge feature on the captured image corresponds to the deterioration degree of the image edge feature in accordance with the captured image.

In the present embodiment, the deterioration degree calculation unit 101 detects positions of groups of model edge features for various relative positions and orientations of the target object with respect to the image capturing apparatus 108. The deterioration degree calculation unit 101 then calculates a deterioration degree for each model edge feature. The deterioration degree holding unit 102 holds a group of deterioration degrees calculated for a group of model edge features in association with a relative position and orientation of the target object with respect to the image capturing apparatus 108. Here, the deterioration degree calculated for each model edge feature is associated with the relative position and orientation of the model edge feature with respect to the image capturing apparatus 108.

In the present embodiment, if the relative position and orientation of the target object with respect to the image capturing apparatus 108 is the same, it is assumed that the deterioration degree of the captured image is also the same. If image capturing conditions of the image capturing apparatus 108, such as the focal position and the aperture value, are fixed, it is estimated that the bokeh amount of the captured image is similar if the relative position and orientation of the target object with respect to the image capturing apparatus 108 is fixed.

A case in which when an industrial robot grips the target object, the position and orientation of the target object are measured by capturing the target object using the image capturing apparatus 108, which is fixed to the robot is envisioned. Because it is predicted that the industrial robot repeats a fixed operation, it can be considered that the speed of the image capturing apparatus 108 in accordance with the position and orientation of the image capturing apparatus 108 is fixed. In addition, it can be considered that the target object is stationary or is moving at a fixed speed riding on a conveyor-belt or the like. Accordingly, if image capturing conditions of the image capturing apparatus 108, such as shutter speed, are fixed, it is estimated that the blur amount of the captured image is similar if the relative position and orientation of the target object with respect to the image capturing apparatus 108 is fixed.

In another embodiment, the deterioration degree calculation unit 101 may use various image capturing conditions in accordance with the image capturing apparatus 108 to calculate a group of deterioration degrees. In such a case, the deterioration degree holding unit 102 can hold a group of deterioration degrees in association with image capturing conditions and the relative position and orientation of the target object with respect to the image capturing apparatus 108. In such a case, for example, it is possible to estimate the position and orientation of the target object by using a group of deterioration degrees that corresponds to a coarse position/orientation of the target object and image capturing conditions of the captured image obtained by the image obtaining unit 103.

The image obtaining unit 103 obtains the captured image which is acquired by capturing the target object. In the present embodiment, the image obtaining unit 103 obtains from the image capturing apparatus 108 the captured image of the target object which is captured by the image capturing apparatus 108, which is connected to the information processing apparatus 1. In another embodiment, the image obtaining unit 103 may obtain the captured image from a storage unit (not shown) which the information processing apparatus 1 comprises and which stores the captured image. Furthermore, the image obtaining unit 103 may obtain the captured image from an external storage apparatus (not shown) that is connected to the information processing apparatus 1 via a network and stores the captured image obtained by the image capturing apparatus 108. In addition, a type of the captured image is not particularly limited if it is possible to extract features of the image of the target object. For example, the captured image may be a gray-scale image, may be a color image, or may be a range image.

The feature extraction unit 104 extracts features of the image of the target object from the captured image obtained by the image obtaining unit 103. In the present embodiment, the feature extraction unit 104 extracts an edge feature by performing edge detection processing with respect to the captured image. In this case, the feature extraction unit 104 extracts the edge feature by referring to the deterioration degree that the deterioration degree holding unit 102 holds. In other words, the feature extraction unit 104 sets an extraction parameter, which is used to extract a feature from the captured image, in accordance with the deterioration degree. The feature extraction unit 104 refers to the captured image and uses the set extraction parameter to extract a plurality of features from the captured image. In this way, the feature extraction unit 104 has a deterioration degree obtainment unit that obtains a deterioration degree that the deterioration degree holding unit 102 holds.

Specifically, the feature extraction unit 104 first obtains a group of deterioration degrees corresponding to a coarse value of a current position and orientation of the target object from the deterioration degree holding unit 102. In the present embodiment the feature extraction unit 104 specifies, from positions and orientations of the target object associated with groups of deterioration degrees held by the deterioration degree holding unit 102, the closest to the coarse value of the current position and orientation of the target object. The feature extraction unit 104 obtains a group of deterioration degrees associated with the specified position and orientation of the target object.

The feature extraction unit 104 sets an extraction parameter for extracting an edge feature based on an obtained deterioration degree. In the present embodiment, a filter coefficient of an edge extraction filter is set as the extraction parameter. Furthermore, the feature extraction unit 104 extracts the edge feature by applying the set filter to the captured image. Below, the edge feature that the feature extraction unit 104 extracts from the captured image is referred to as an image edge feature. A method of setting the filter is described later.

A coarse position and orientation of the target object can be obtained by using a publicly known method. As an example of a method that obtains a coarse position and orientation of the target object, the method recited in Hiroto Yoshii, "Coarse Position/Orientation Detection of Bulk Parts Using Ensemble Classification Tree", Image Recognition and Understanding Symposium (MIRU2010), 2010 is given. As a coarse position and orientation of the target object, the position and orientation of the target object estimated directly prior may also be used.

The model holding unit 106 holds the three-dimensional model of the target object. The three-dimensional model illustrates a three dimensional geometric shape of the target object. The expression format of the geometric shape is not particularly restricted. For example, the three-dimensional model may be data of a polygon format, i.e. may have a collection of planes and lines configured by three-dimensional points for expressing the geometric shape. The three-dimensional model may have a collection of three-dimensional lines that express edge lines, or may have a collection of simple three-dimensional points. In the present embodiment, the model holding unit 106 holds the position information of a three-dimensional edge feature (model edge feature) extracted from the three-dimensional model of the target object.

An example of a method of extracting the model edge feature that the model holding unit 106 holds is shown below. The image obtained in this way is called a projection image. In other words, the image obtained by the image capturing apparatus 108 capturing the target object is estimated by using the three-dimensional model of the target object. For example, this processing can be implemented by arranging the three-dimensional model and a viewpoint corresponding to the image capturing apparatus 108 in a virtual space in accordance with the relative position and orientation of the target object with respect to the image capturing apparatus 108, and generating an image of the target object from the viewpoint.

Next, by applying a differential filter to the obtained projection image, an edge feature on the projection image is extracted. Furthermore, by back projecting the edge feature of the projection image onto the three-dimensional model, the model edge feature is extracted. For example, it is possible to extract a group of points on the three-dimensional model that corresponds to the edge feature on the projection image as the model edge feature. By performing the above processing on various relative positions and orientations of the target object with respect to the image capturing apparatus 108, one or more groups of model edge features are extracted in each relative position and orientation. The model holding unit 106 holds position information of the extracted one or more groups of model edge features. In the present embodiment, the model holding unit 106 holds the position information of the extracted one or more groups of model edge features in association with the relative position and orientation of the target object with respect to the image capturing apparatus 108. In such a case, the position information of the model edge feature may indicate the relative position and orientation of the model edge feature with respect to the image capturing apparatus 108.

The method of extracting the model edge feature from the three-dimensional model is not limited to the above described method, and using another method is possible. For example, if the three-dimensional model holds normal information of a surface, a location for which a normal direction is non-consecutive can be extracted as the model edge feature. The model holding unit 106 may collectively hold groups of model edge features extracted in various relative positions and orientations. For example, the model holding unit 106 may hold model edge feature position information in the three-dimensional model. In such a case, it is possible to calculate the relative position and orientation of a model edge feature with respect to the image capturing apparatus 108, based on the relative position and orientation of the three-dimensional model with respect to the image capturing apparatus 108.

Model information that the model holding unit 106 holds may be the three-dimensional model itself. Furthermore, the model information may be information of a direction and position on the projection image of a two-dimensional edge feature image obtained by projecting a three-dimensional model edge feature onto a captured image surface of the image capturing apparatus 108. Even in such a case, it is possible to cause the feature indicated by the model information to match with the feature extracted from the image. Furthermore, the model information may be an image obtained by capturing the target object. In such a case, a feature extracted from this image can be caused to be matched to a feature extracted by the feature extraction unit 104. In addition, it is also possible to cause matching between images in accordance with a later-described fifth embodiment. Furthermore, the model information may have an identifier that specifies the type of the target object.

The matching unit 107 calculates the position and orientation of the target object. The matching unit 107 performs association of a feature of the target object and a feature of the three-dimensional model observed when the three-dimensional model is arranged in accordance with a predetermined position and orientation. The position and orientation of the target object with respect to the image capturing apparatus 108 are then derived by correcting a predetermined position and orientation based on a result of the associating and a deterioration degree corresponding to the position for which the feature was extracted.

An overview of the processing performed by the matching unit 107 is as below. Firstly, the matching unit 107 calculates a difference for each of a plurality of features extracted from the image of the target object, between the respective feature and a feature of an image of a comparison target corresponding to the feature. In the present embodiment, the matching unit 107 calculates a difference, for each of a plurality of edge features extracted from the image of the target object, between the respective edge feature and an edge feature of the image of the comparison target that corresponds to the edge feature. Here, the image of the comparison target is a three-dimensional model image observed when a viewpoint and a three-dimensional model are arranged in accordance with a predetermined position and orientation. In the present embodiment, first the difference is calculated by using the three-dimensional model image when the viewpoint and the three-dimensional model are arranged in accordance with the coarse position/orientation of the target object obtained as described above. The difference is similarly calculated by using a plurality of three-dimensional model images obtained while changing the relative position and orientation between the viewpoint and the three-dimensional model.

As a specific example, the matching unit 107 obtains a group of model edge features corresponding to the current relative position and orientation of the target object with respect to the image capturing apparatus 108, from the groups of model edge features that the model holding unit 106 holds. For example, the matching unit 107 can detect, from the relative positions and orientations associated with the groups of model edge features that the model holding unit 106 holds, something closest to the coarse value of the current relative position and orientation of the target object with respect to the image capturing apparatus 108. The matching unit 107 then obtains the group of model edge features associated with the detected relative position and orientation. For each of the groups of model edge features thus obtained, the relative position and orientation of each edge with respect to the viewpoint—i.e. the image capturing apparatus 108—is specified.

The matching unit 107 next associates corresponding image edge features extracted by the feature extraction unit 104 for each of the obtained groups of model edge features. The method of the associating is not particularly limited, and associating can be performed by the following method, for example. Firstly, for each of a plurality of edges that the three-dimensional model has, the matching unit 107 calculates an image position obtained by projecting on the projection image based on a predetermined position and orientation. For example, the matching unit 107 calculates the image position on the projection image observed when the viewpoint and the three-dimensional model are arranged in accordance with a predetermined position and orientation for each of the groups of model edge features. The projection image includes the three-dimensional model image observed when the viewpoint and the three-dimensional model are arranged in accordance with the predetermined position and orientation, and this three-dimensional model image is configured by images of a plurality of model edge features. Image edge features are then associated with model edge features, so that the image positions of the model edge features on the projection image approach the image positions of the image edge features on the captured image. An example of such a method of associating is explained later. It is sufficient to use information embedded in the target object, or the like, to identify an image edge feature corresponding to a model edge feature.

In a case where the model holding unit 106 holds the three-dimensional model as model information, the matching unit 107 obtains the three-dimensional model from the model holding unit 106. Next, the matching unit 107 projects the obtained three-dimensional model on a captured image surface of the image capturing apparatus 108 based on a coarse value of the current relative position and orientation of the target object with respect to the image capturing apparatus 108. Thus, the image of the three-dimensional model observed when a viewpoint and a three-dimensional model are arranged in accordance with a predetermined position and orientation is obtained. Furthermore, the matching unit 107 extracts model edge features from the projection image by using a method similar to the method of extracting model edge features that the model holding unit 106 holds. The matching unit 107 associates extracted model edge features with image edge features through the above described method.

The matching unit 107 obtains a reliability w that is applied to an image edge feature from the reliability calculation unit 105. The reliability w indicates a probability that an image edge feature is correctly extracted from the captured image, for example a probability that it is extracted at a correct position. In the present embodiment, the reliability w applied to an image edge feature is obtained in accordance with a deterioration degree for a corresponding model edge feature. As described above, because the deterioration degree expresses a degree of deterioration of the image for an image edge feature corresponding to a model edge feature on the captured image, it is possible to calculate the reliability w in accordance with the deterioration degree. In other embodiments, the reliability calculation unit 105 can calculate the reliability w in accordance with a deterioration degree corresponding to an image position at which the image edge feature was extracted.

The matching unit 107 then refers to a groups of model edge features, a group of image edge features, and the reliability w, and calculates a position and orientation of the target object. In the present embodiment, the matching unit 107 determines that a three-dimensional model image for which a degree of matching is highest with respect to the image of the target object, from a plurality of three-dimensional model images, as the image of the comparison target with respect to the image of the target object. Here, the degree of matching corresponds to a value obtained based on differences between corresponding model edge features and a plurality of image edge features, which are weighted in accordance with the deterioration degree corresponding to the position at which the image edge feature was extracted.

In the present embodiment, the differences between the image edge features and the model edge features are distances between the image positions of the image edge features on the captured image and the image positions of the model edge features on the projection image. The weighting uses the reliability w calculated in accordance with the deterioration degree. Specifically, a large weighting is performed to the extent that the probability that the image of the image edge feature is correctly extracted is high.

In the present embodiment, the matching unit 107 uses the coarse position/orientation of the target object as an initial position and orientation between the viewpoint and the three-dimensional model. The matching unit 107 then performs optimization of the position and orientation between the viewpoint and the three-dimensional model so that a degree of matching becomes higher. When the degree of matching becomes highest, the matching unit 107 determines that the image of the three-dimensional model matches the image of the target object, i.e. that the position and orientation of the three-dimensional model with respect to the viewpoint represents the position and orientation of the target object with respect to the image capturing apparatus 108. Details of this optimization calculation are also explained later.

The reliability calculation unit 105 calculates the reliability w for an image edge feature that corresponds to a model edge feature, based on the deterioration degree for the model edge feature. In the present embodiment, calculation of the reliability w is performed so that the reliability w becomes low to the extent that the deterioration degree for the model edge feature is high.

An example of specific processing is described below. Firstly, the reliability calculation unit 105, for each model edge feature for which a corresponding image edge feature has been detected, performs obtaining of information of a deterioration degree $\sigma_0$, which is stored in association with the position and orientation of the target object corresponding to the image capturing apparatus, from the deterioration degree holding unit 102. In this way, the reliability calculation unit 105 has a deterioration degree obtainment unit that obtains the deterioration degree that the deterioration degree holding unit 102 holds. The reliability calculation unit 105 then calculates the reliability w for the image edge feature based on the obtained deterioration degree $\sigma_0$.

The reliability w is not particularly limited if it is a value defined to be high to the extent that the probability that the image edge feature is correctly extracted is high. In an embodiment where at least one of the bokeh amount and the blur amount is used as the deterioration degree, the reliability w is defined so that the reliability w becomes low to the extent that the bokeh amount is large or to the extent that the blur amount is large. In the present embodiment, the reliability w is defined by using a function in which a statistic of the deterioration degree $\sigma_0$ obtained in accordance with the bokeh amount and the blur amount is included as a parameter. As the statistic, an average value, a variance value, or the like of the deterioration degree is given, but the statistic is not particularly limited. For example, the reliability w can be expressed by using a Tukey function shown in Equation (1).

[EQUATION 1]

$$w(b) = \begin{cases} (1 - (b/c)^2)^2 & |b| \le c \\ 0 & |b| > c \end{cases} \quad (1)$$

In Equation (1), c is an average value of the deterioration degree $\sigma_0$ for the model edge features for which a corresponding image edge feature is detected—in other words a statistic—and b is the deterioration degree $\sigma_0$ of the respective model edge feature. Note that a type of the function is not particularly limited, and another function, in which the reliability w becomes low to the extent that the deterioration degree is high and the reliability w becomes high to the extent that the deterioration degree is low, can be used. For example, reliability may be expressed by a Gaussian function, a Huber function, or the like. In addition, the reliability w may be expressed by a function, such as a Tukey function, in which an allowable value of the deterioration degree that is set in advance is used instead of the statistic c.

<Processing According to the Present Embodiment>

Next, an example of processing in the present embodiment is explained with reference to the flowchart of FIG. 2.

In step S201, the deterioration degree holding unit 102 determines whether a deterioration degree is already held. If the deterioration degree is held, the processing proceeds to step S204. If the deterioration degree is not held, the processing proceeds to step S202. In step S202, the deterioration degree calculation unit 101 calculates the deterioration degree. A method of calculating the deterioration degree is described later. In step S203, the deterioration degree holding unit 102 holds the deterioration degree calculated in step S202. In this way, in the present embodiment, calculation and holding of the deterioration degree is performed as initial processing of the information processing apparatus 1 in step S201 and step S202 before the image obtaining unit 103 obtains the captured image. The deterioration degree holding unit 102 may obtain and hold a deterioration degree that is calculated in advance from an external apparatus, a storage medium, or the like.

In step S204, the image obtaining unit 103 obtains the captured image obtained by the image capturing apparatus 108 capturing the target object. In step S205, the feature extraction unit 104 extracts an image edge feature from the captured image obtained in step S204. The feature extraction unit 104 sets a filter based on the deterioration degree obtained from the deterioration degree holding unit 102, and extracts the image edge feature by applying the filter to the captured image. Specific processing in step S205 is described later. In step S206, the matching unit 107 calculates the position and orientation of the target object. Specific processing is described later.

<Deterioration Degree Calculation Processing>

Next, explanation is given with reference to the flowchart of FIG. 3 for processing of step S202, in which the deterioration degree calculation unit 101 calculates the deterioration degree. In the present embodiment, the deterioration degree calculation unit 101 arranges the viewpoint and the three-dimensional model of the target object in accordance with various positions and orientations of the target object with respect to the image capturing apparatus 108. Considering image capturing conditions according to the image capturing apparatus 108, the deterioration degree of the image of the three-dimensional model seen from the viewpoint is calculated. The deterioration degree thus obtained can be used as an estimated value of the deterioration degree of the image of the target object obtained when the image capturing apparatus 108 captures the target object.

In the present embodiment, a bokeh amount D, a blur amount B, and a deterioration degree $\sigma_0$ obtained in accordance with the bokeh amount and the blur amount are calculated as the deterioration degree. In addition, the image capturing conditions for the target object in accordance with the image capturing apparatus 108 include the relative speed between the target object and the image capturing apparatus 108, as well as image capturing parameters, such as the exposure time, the focal position, and the aperture of the image capturing apparatus 108, or the like. Explanation is given below of a method of calculating the deterioration degree in accordance with a simulation that uses these pieces of information.

Explanation is given below for a method of calculating the deterioration degree for each model edge feature that the model holding unit 106 holds position information for. In another embodiment, the deterioration degree calculation unit 101 detects a position of a model edge feature for various relative positions and orientations of the target object with respect to the image capturing apparatus 108, and calculates the deterioration degree for each of the model edge features. In such a case, the deterioration degree calculation unit 101 can detect the model edge feature using the above described method as a method to extract the model edge feature that the model holding unit 106 holds. The method of calculating the deterioration degree for the detected model edge feature can be performed as below.

In step S301, the deterioration degree calculation unit 101 obtains image capturing conditions for when the image capturing apparatus 108 captures the target object. The image capturing conditions include an image capturing parameter that has an effect on the captured image in accordance with the image capturing apparatus 108: for example the focal distance, focus position, the aperture value, the exposure time, or the like. The image capturing conditions include the relative speed between the image capturing apparatus 108 and the target object. The relative speed expresses a relative movement direction and speed between the target object and the image capturing apparatus 108.

For example, when the target object performs a translational motion in one axial direction on the conveyor-belt, it is possible to calculate a movement speed and a movement direction of the target object based on setting data, a setting value, or the like. The movement direction and movement speed of the target object may be detected by using a sensor or the like. The relative speed between the image capturing apparatus 108 and the target object can be calculated based on the movement direction and the movement speed of the target object, as well as the relative position and orientation of the target object with respect to the image capturing apparatus 108 associated with the model edge feature.

In step S302, the deterioration degree calculation unit 101 selects one model edge feature, for which the deterioration degree is calculated, from a group of model edge features that the model holding unit 106 holds position information for. In step S303, the deterioration degree calculation unit 101 calculates a predicted bokeh amount D for the model edge feature selected in step S302. The method for calculating the bokeh amount is not particularly limited; it can be calculated by using a publicly known formula. The calculation of the bokeh amount can be performed by using an image capturing parameter such as the focal distance of the image capturing apparatus 108, the aperture value of the image capturing apparatus 108 and the distance between the image capturing apparatus 108 and the focal plane, as well as a distance between the image capturing apparatus 108 and the model edge feature, or the like. In the present embodiment, the deterioration degree calculation unit 101 uses Equation (2) below to calculate the bokeh amount D.

[EQUATION 2]

$$D = \frac{f^2(L_o - L_n)}{FL_n(L_o - f)\Delta d} \quad (2)$$

In Equation (2), f represents the focal distance of an imaging lens of the image capturing apparatus 108. $L_o$ represents a focus position of a virtual viewpoint. $L_n$ represents a distance from the virtual viewpoint to the model edge feature. F represents an aperture value of the imaging lens of the image capturing apparatus 108. $\Delta d$ represents the size of a pixel. $L_n$ can be calculated based on position information of the model edge feature. An image capturing parameter of the image capturing apparatus 108, such as the aperture value or focal distance of the imaging lens, may be set in advance in accordance with a specification of the image capturing apparatus 108, or may be obtained from the image capturing apparatus 108 by the deterioration degree calculation unit 101. In addition, an image capturing parameter may be calibrated in advance in accordance with, for example, a method disclosed in R. Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, no. 4, 1987. Image capturing parameters may further include a lens distortion parameter or the like, and the bokeh amount may be calculated in reference to such a further parameter.

In step S304, the deterioration degree calculation unit 101 calculates a predicted blur amount for the model edge feature selected in step S302. The method for calculating the blur amount is not particularly limited, and can be calculated by using a publicly known formula. Below, explanation is given for an example of a method for calculating the blur amount. In the present embodiment the deterioration degree calculation unit 101 calculates the movement amount on the captured image of the model edge feature during the exposure time as the blur amount. The blur amount can be calculated based on the relative position and orientation of the model edge feature with respect to the image capturing apparatus 108, and image capturing conditions according to the image capturing apparatus 108, such as the exposure time and the relative speed between the image capturing apparatus 108 and the target object. In the following example, the movement amount of the model edge feature on the captured image during the exposure time is calculated as the blur amount.

In the present embodiment, the deterioration degree calculation unit 101 calculates a Jacobian of a model edge feature on the captured image. The deterioration degree calculation unit 101 then calculates the blur amount of a model edge feature based on the Jacobian of the model edge feature, the relative speed between the target object and the image capturing apparatus 108, as well as the exposure time.

The Jacobian of the model edge feature is a value that represents a ratio at which the position of the image of the model edge feature changes on the captured image when a position and orientation parameter of six-degrees-of-freedom changes with respect to the target object slightly.

Below, the position and orientation of the target object is represented as s, the position of the image of the model edge feature when exposure starts is represented as (u, v), the position of the image of the model edge feature when exposure ends is represented as (u', v'), and a normal direction (unit vector) of the image of the model edge feature is represented as $(n_u, n_v)$. Thereby, a signed distance $err_{2D}$ between the image of the model edge feature when exposure starts and the image of the model edge feature when the exposure ends can be calculated by the following Equation (3).

[Equation 3]

$$err_{2D} = n_u(u'-u) + n_v(v'-v) \quad (3)$$

The position and orientation s of the target object is a six-dimensional vector, and has three elements $(s_1, s_2, s_3)$ that express the position of the target object and three elements $(s_4, s_5, s_6)$ that express the orientation of the target object. The method of expressing orientation by the three elements is not particularly limited. For example, the orientation can be expressed by Euler angles. In addition, it is possible to express the orientation by a three-dimensional vector, for which a normal of the vector expressed a rotation angle and a direction of the vector represents a rotation axis that passes through the origin point. By partially differentiating the distance between correspondent elements $err_{2D}$ by each element of the position and orientation s, it is possible to calculate a Jacobian matrix $J_{2D}$ of a model edge feature, as in the following Equation (4).

[EQUATION 2]

$$J_{2D} = \begin{bmatrix} \frac{\partial err_{2D}}{\partial s_1} & \frac{\partial err_{2D}}{\partial s_2} & \frac{\partial err_{2D}}{\partial s_3} & \frac{\partial err_{2D}}{\partial s_4} & \frac{\partial err_{2D}}{\partial s_5} & \frac{\partial err_{2D}}{\partial s_6} \end{bmatrix} \quad (4)$$

By performing the above processing on each model edge feature, the deterioration degree calculation unit 101 calculates the Jacobian of each model edge feature. Accordingly, the blur amount B of the model edge feature that occurs in accordance with the target object moving at the relative speed V during an exposure time $t_i$ of the image can be calculated in accordance with the following Equation (5) by using the Jacobian of the model edge feature.

[Equation 5]

$$B = t_i J_{2D} V \quad (5)$$

The obtained the blur amount B is a scalar, and represents a movement amount of the position of the image of the model edge feature on the captured image during the exposure time. By performing the above processing on each model edge feature, the deterioration degree calculation unit 101 calculates the blur amount B for each model edge feature.

In step S305, the deterioration degree calculation unit 101 calculates the deterioration degree $\sigma_0$ by using the blur amount B obtained in step S304 and the bokeh amount D obtained in step S303, for each model edge feature. The specific method of calculating the deterioration degree $\sigma_0$ is not particularly limited. In the present embodiment, the deterioration degree calculation unit 101 calculates the deterioration degree $\sigma_0$ so that the deterioration degree $\sigma_0$ becomes large to the extent that the bokeh amount D and the blur amount B are large. For example, the deterioration degree $\sigma_0$ can be calculated by using Equation (6). The deterioration degree $\sigma_0$ can be defined by any method if it becomes big to the extent that the deterioration degree of the image is high.

[Equation 6]

$$\sigma_0 = \sqrt{D^2 + B^2} \quad (6)$$

In step S306, the deterioration degree calculation unit 101 determines whether calculation has been performed for the deterioration degree—in other words the bokeh amount D and the blur amount B—for all edge features. When the calculation of the deterioration degree is finished, processing terminates. If calculation of the deterioration degree has not finished, the processing returns to step S302. The deterioration degree holding unit 102 holds the thus calculated deterioration degrees—in other words the bokeh amount D and the blur amount B—in association with model edge features.

<Filter Setting and Edge Extraction Processing>

Next, the flowchart of FIG. 4 is used to give an explanation of detailed processing in step S205 that extracts an image edge feature from a captured image. In the present embodiment, the feature extraction unit 104 sets the filter in accordance with the deterioration degree of the captured image. The feature extraction unit 104 then extracts the image edge feature by applying the set filter to the obtained image. In the present embodiment, one filter is set in accordance with the position and orientation of the target object, and the image edge feature is extracted by applying this one filter to the captured image on the whole.

In step S401, the feature extraction unit 104 obtains the captured image of the target object that the image obtaining unit 103 obtained. In step S402, the feature extraction unit 104 obtains from the deterioration degree holding unit 102 a group of deterioration degrees corresponding to the position and orientation of the target object. In the present embodiment, the bokeh amount D and the blur amount B are obtained as the deterioration degree. The bokeh amount D and the blur amount B are held for each model edge feature, and in the following processing, statistics of the bokeh amount D and the blur amount B, for example average values for the plurality of model edge features, are used.

In step S403, the feature extraction unit 104 sets an extraction parameter for extracting the edge feature. In the present embodiment, the feature extraction unit 104 sets a filter for extracting the image edge feature from the captured image. In the present embodiment, the feature extraction unit 104 calculates a predicted waveform of an edge feature with reference to the bokeh amount D and the blur amount B obtained in step S402. In the present embodiment, specifically, the feature extraction unit 104 calculates the waveform of the image of the predicted model edge feature by performing a convolution calculation of a Gaussian function of a standard deviation D and a rectangular wave for which the width is B and the height is 1, as shown in FIGS. 5A to 5F.

Figure 5A:
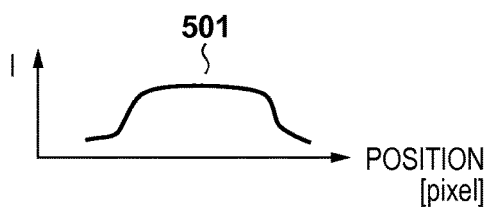
FIGS. 5A-5F are views showing a filter for extracting an edge feature.
Figure 5D:
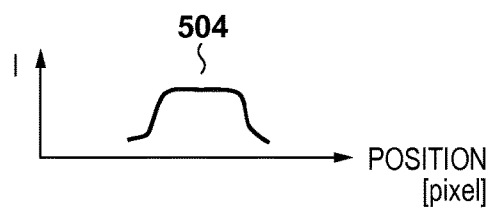
Figure 5B:
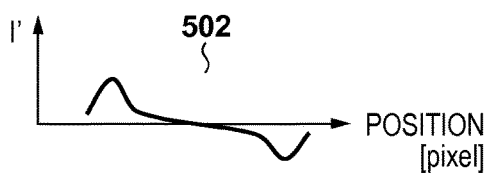
Figure 5E:
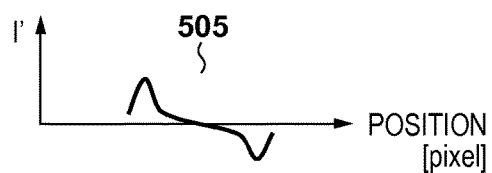
Figure 5C:
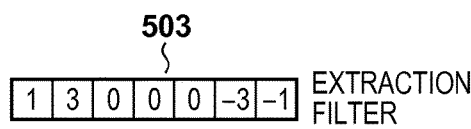
Figure 5F:
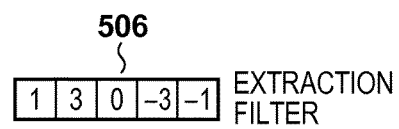

FIGS. 5A and 5D show waveforms 501, 504 calculated by using the bokeh amount D and the blur amount B. Next, as shown in FIGS. 5B and 5E, the feature extraction unit 104 calculates waveforms 502, 505 by differentiating the obtained waveforms 501, 504. The waveforms 502, 505 thus obtained are extraction filters corresponding to the waveforms 501, 504, and edges can be extracted from the waveforms 501, 504 with high precision. Finally, the feature extraction unit 104 obtains the extraction filters 503, 506 by using a predetermined threshold to quantize the waveforms 502, 505. Thus, as shown in FIGS. 5C and 5F, the extraction filters 503, 506—which are used for convolution calculation with respect to the captured image—are set. The extraction filters 503, 506 thus obtained are equivalent to differential filters.

The extraction filter 503 is used when the bokeh amount D and the blur amount B are larger, as shown in the waveform 501. Also, the extraction filter 506 is used when the bokeh amount D and the blur amount B are smaller, as shown in the waveform 504. In this way, in the present embodiment, a large size filter is used to the extent that the deterioration degree (the bokeh amount D and the blur amount B) is large, and a small size filter is used to the extent that the deterioration degree is small. In addition, instead of the bokeh amount D and the blur amount B, the deterioration degree $\sigma_0$ calculated as description above can be used. In such a case, a large size filter is used to the extent that the deterioration degree $\sigma_0$ is large, and a small size filter is used to the extent that the deterioration degree is small.

Here, explanation is given for when a one-dimensional filter is used as the extraction filter. However, it is possible to use a two-dimensional filter as the extraction filter. In such a case, it is possible to set such that a large size filter is used to the extent that the deterioration degree is large, and a small size filter is used to the extent that the deterioration degree is small respectively.

In step S404, the feature extraction unit 104 extracts an edge feature (image edge feature) by applying the filter set in step S403 to the captured image. In the present embodiment, a map that indicates edge intensity is obtained by applying the filter to the captured image.

<Processing to Estimate Position and Orientation>

Figure 6:
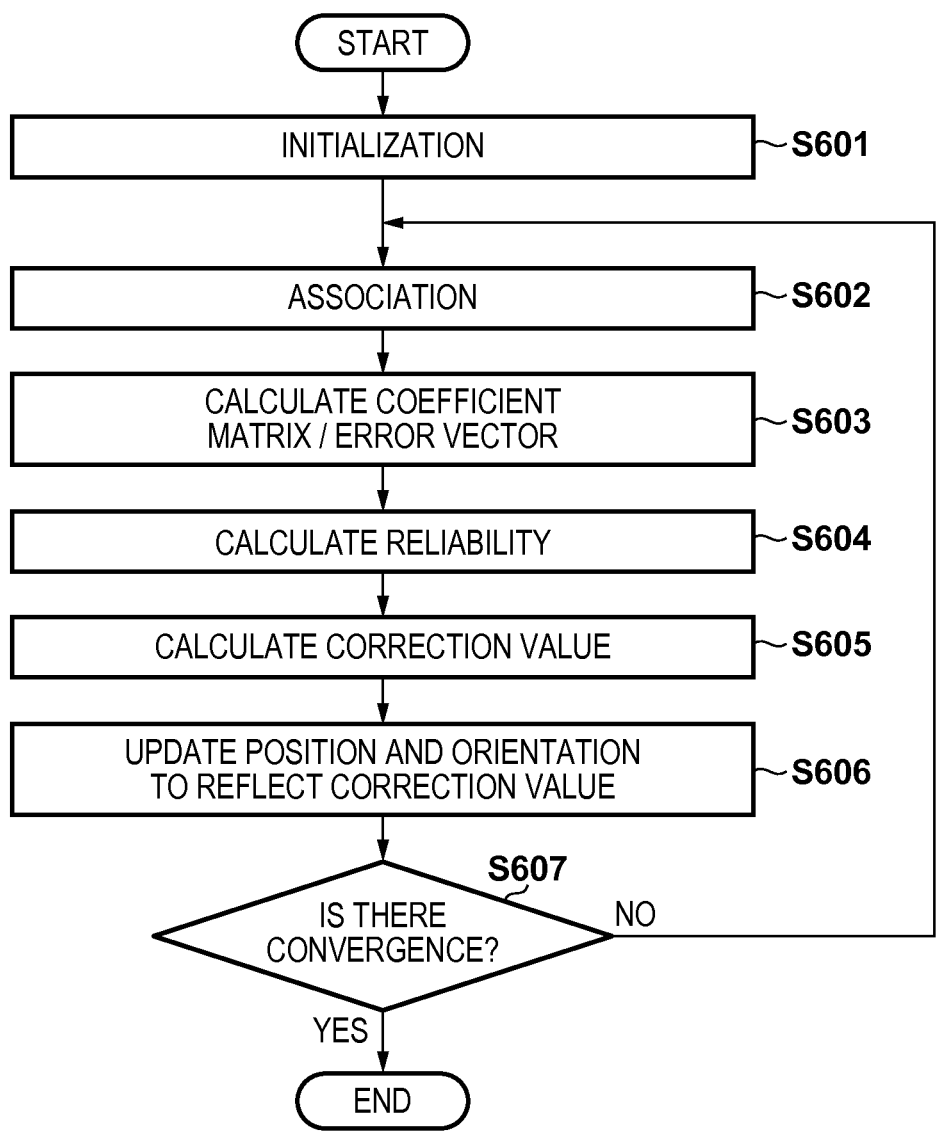
FIG. 6 is a flowchart of position and orientation calculation processing according to the first embodiment.

Next, explanation is given with reference to the flowchart of FIG. 6 for a method of estimating the position and orientation of the target object in step S206. In the present embodiment, the matching unit 107 estimates the position and orientation of the target object by optimizing the position and orientation of the three-dimensional model so that image edge features and images of model edge features projected on the captured image fit. Here, the matching unit 107 uses the Gauss-Newton method to optimize the position and orientation of the three-dimensional model so that a sum total of distances on the captured image between images of model edge features and image edge features is minimized.

In step S601, the matching unit 107 performs initialization processing. Firstly, the matching unit 107 obtains a coarse position/orientation of the target object, and sets it as the position and orientation s of the three-dimensional model. As described above, the matching unit 107 obtains from the model holding unit 106 the group of model edge features corresponding to the coarse relative position and orientation of the target object with respect to the image capturing apparatus 108.

Figure 7A:
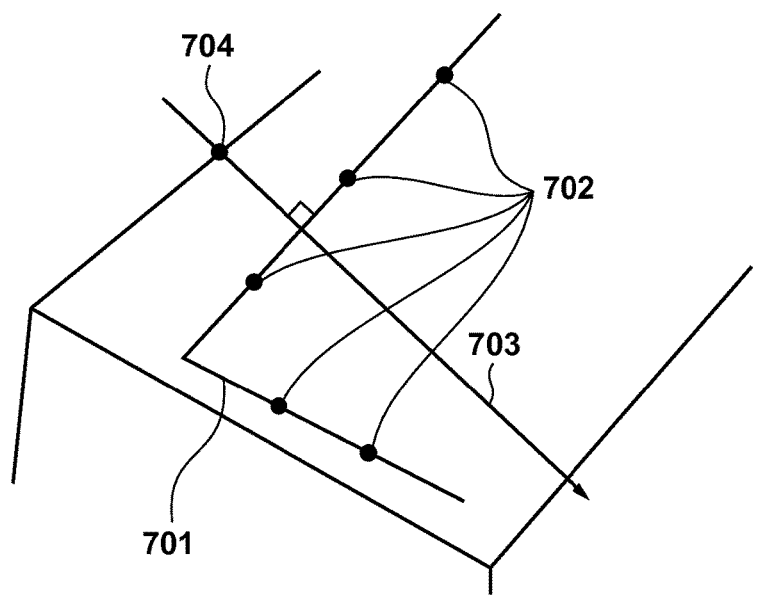
FIGS. 7A and 7B are views explaining a method of associating the edge feature.

In step S602, the matching unit 107 associates each of the obtained groups of model edge features and each of the groups of image edge features extracted by the feature extraction unit 104. The method of the associating is not particularly limited, and associating can be performed as follows, for example. Firstly, the matching unit 107 projects model edge features on the captured image surface of the image capturing apparatus 108 based on a coarse value of the current relative position and orientation of the target object with respect to the image capturing apparatus 108. Thus the matching unit 107 calculates the position and direction of the model edge feature in the captured image surface of the image capturing apparatus 108. FIG. 7A shows the projected model edge feature 701.

Next, the matching unit 107 sets a plurality of control points 702 on the projected model edge feature 701 so that they are evenly spaced apart on the captured image surface. Furthermore, the matching unit 107 sets, for each control point 702, a search line 703 in the normal direction of the projected model edge feature 701. The matching unit 107 then, for each control point 702, searches for an image edge feature present on the search line 703 in a predetermined range from the control point 702.

Figure 7B:
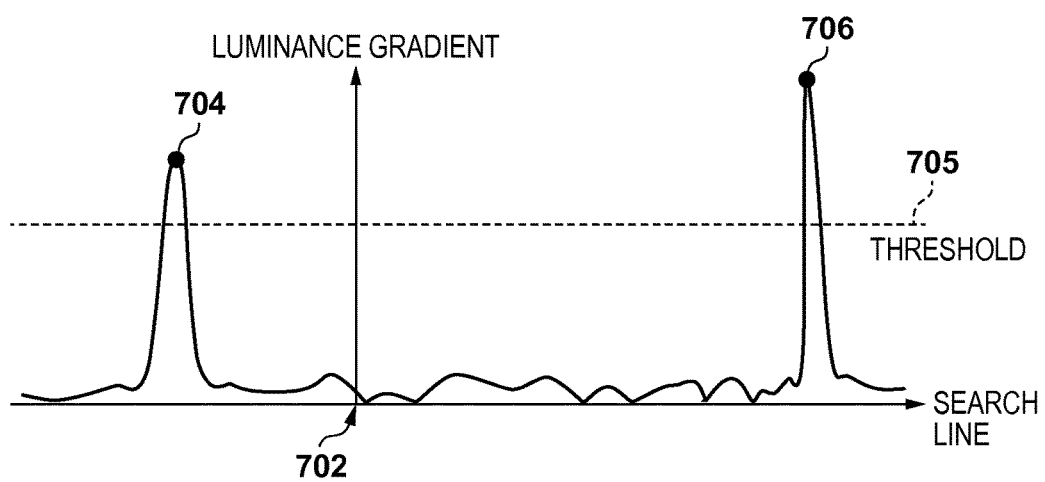

In FIG. 7B, the origin point is the control point 702, the abscissa axis is the search line, and the ordinate axis shows the absolute value of a pixel value of an edge intensity map. In the present embodiment, the edge intensity map is obtained by the feature extraction unit 104 applying the differential filter to the captured image in step S404. In other words, the absolute value of the pixel value of the edge intensity map corresponds to the absolute value of a luminance gradient of the captured image. The matching unit 107 detects, as the image edge feature, a point for which the absolute value of the luminance gradient is an extreme value. In the present embodiment, the matching unit 107 detects as the corresponding point a point for which the absolute value of the luminance gradient is an extreme value and is greater than a predetermined threshold 705.

FIG. 7B shows corresponding points 704, 706 thus found. From the found corresponding points 704, 706, the matching unit 107 records the corresponding point 704, which is closest to the control point 702 as a corresponding point that corresponds to the control point 702. By this processing, the corresponding point for each of the plurality of control points 702 is detected. The corresponding point 704 thus detected is a point on an image edge feature 800 corresponding to the model edge feature 701.

Below, processing that uses one control point for each model edge feature is performed. From a plurality of control points set for one model edge feature, it is possible for the matching unit 107 to select and use in later processing one control point for which a corresponding point is detected. A method of selecting is not particularly limited. A corresponding image edge feature may not be detected for several model edge features.

In steps S603 to S605, the matching unit 107 calculates the position and orientation of the target object as described above. In an embodiment, the matching unit 107 can calculate the position and orientation of the target object as follows. For example, the matching unit 107 calculates a degree of matching with the image of the target object for a plurality of three-dimensional model images obtained by changing the position and orientation. Here, the degree of matching is obtained based on distances between image positions of corresponding model edge features and image positions of a plurality of image edge features, which are weighted in accordance with the deterioration degree corresponding to the position at which the image edge feature was extracted. The weighting is performed so that the weight becomes small to the extent that the deterioration degree is high.

In one example, the matching unit 107 uses as an evaluation function a sum total of weighted distances obtained by multiplying the reliability w as the weight with the distance on the captured image between the corresponding model edge feature and the image edge feature. The evaluation function represents a degree of matching between the three-dimensional model image and the image of the target object.

Then the matching unit 107 determines, from a plurality of three-dimensional model images, the three-dimensional model image that provides the highest degree of matching as the three-dimensional model image corresponding to the image of the target object. The matching unit 107 determines that the position and orientation of the three-dimensional model with respect to the viewpoint that corresponds to the three-dimensional model image thus determined represent the position and orientation of the target object with respect to the image capturing apparatus 108.

However, in the present embodiment, position and orientation of the target object are calculated by using the Gauss-Newton method as follows. By virtue of the following method, the position and orientation of the three-dimensional model with respect to the viewpoint are repeatedly updated so that the degree of matching between the image of the target object and the image of the three-dimensional model becomes large.

In step S603, the matching unit 107 calculates a coefficient matrix J and an error vector E, as follows. Each element of the coefficient matrix J is a one-dimensional partial differential coefficient corresponding to a slight change of the position and orientation of the three-dimensional model for the image coordinates of the model edge feature. The error vector E is the distance on the captured image between the image edge feature and the model edge feature projected on the captured image.

Figure 8:
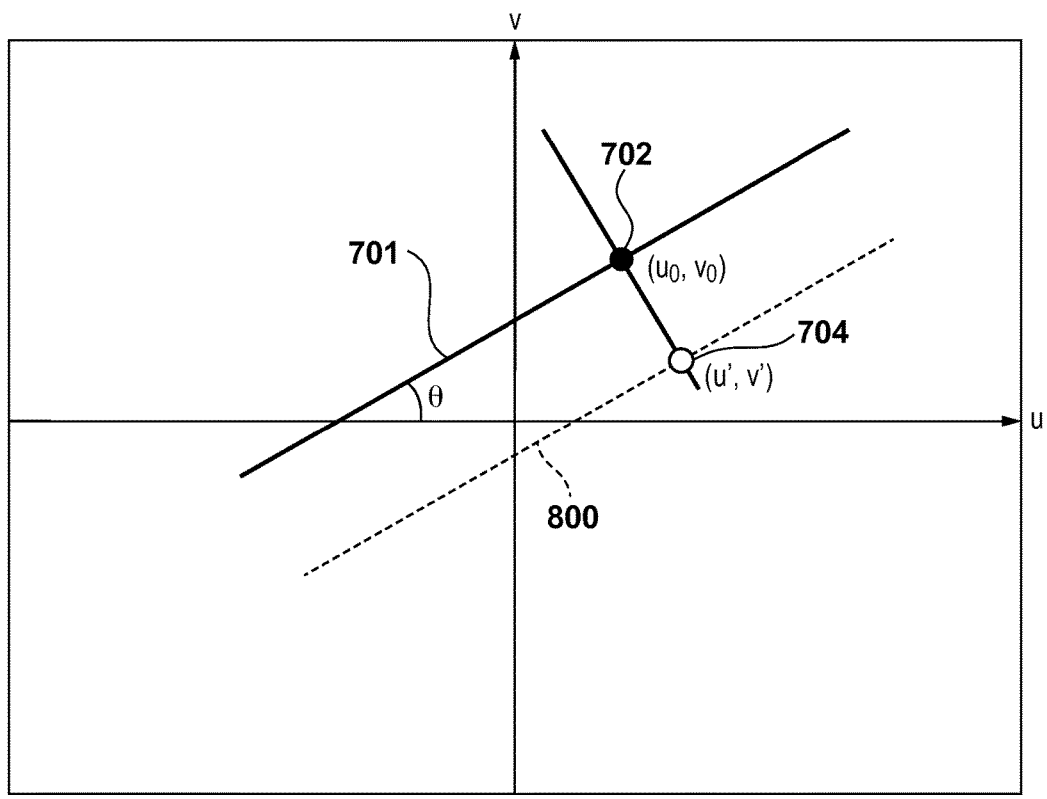
FIG. 8 is a view showing a relation between a model edge feature and an image edge feature.

FIG. 8 shows a relation between the model edge feature 701 projected on the captured image and the image edge feature 800 detected in step S602 that corresponds to the model edge feature 701. In FIG. 8, a u axis and a v axis respectively correspond to a horizontal direction and a vertical direction of the image. The position of the control point 702 on the captured image is expressed as ($u_0$, $v_0$), and a tilt with respect to the u axis on the captured image of the model edge feature 701, to which the control point 702 belongs, is represented as θ. In the following explanation, the tilt at the control point 702 of the model edge feature 701 is θ. In such a case, the normal vector of the model edge feature 701 and in particular the normal vector at the control point 702 is (sin θ, −cos θ). In addition, the image coordinates of the corresponding point 704 that corresponds to the control point 702 are (u', v').

A point (u, v) on a straight line that passes through the point (u', v') and for which a tilt is θ can be expressed as:
[EQUATION 7]

$$u \sin θ − v \cos θ = d \quad (7)$$

$$d = u' \sin θ − v' \cos θ$$

In Equation (7), θ is the constant described above, and d is a constant indicating the above equation.

The position of the control point 702 on the captured image changes in accordance with the position and orientation of the three-dimensional model. As described above, the degrees of freedom of the position and orientation of the three-dimensional model is six-degrees-of-freedom, and the position and orientation s of the three-dimensional model is represented by a six-dimensional vector. The image coordinates (u, v) of the point on the model edge feature 701 corresponding to the control point 702 after the position and orientation of the three-dimensional model has changed can be approximated as in Equation (8) by using a first order Taylor expansion in the neighborhood of ($u_0$, $v_0$). In Equation (8), $Δs_i$ (i=1, 2, . . . , 6) represents slight changes to each component of the six-dimensional vector s.

[EQUATION 8]

$$u \approx u_0 + \sum_{i=1}^{6} \frac{\partial u}{\partial s_i} \Delta s_i \quad (8)$$

$$v \approx v_0 + \sum_{i=1}^{6} \frac{\partial v}{\partial s_i} \Delta s_i$$

If the position and orientation of the three-dimensional model is changed so as to match the position and orientation of the target object, the image coordinates of a point on the model edge feature 701 corresponding to the control point 702 can be assumed to move on the image edge feature 800, i.e. a straight line represented by Equation (7). Equation (9) can be obtained by substituting the (u, v) approximated by Equation (8) into Equation (7). In Equation (9), r is a constant that indicates the second equation.

[EQUATION 9]

$$\sin θ \sum_{i=1}^{6} \frac{\partial u}{\partial s_i} \Delta s_i − \cos θ \sum_{i=1}^{6} \frac{\partial v}{\partial s_i} \Delta s_i = d − r \quad (9)$$

$$r = u_0 \sin θ − v_0 \cos θ$$

Equation (9) holds true for all model edge features for which a corresponding image edge feature is detected in step S602. Accordingly, a linear simultaneous equation for $Δs_i$ of Equation (10) holds true.

[EQUATION 10]

$$\begin{bmatrix} \sin θ_1 \frac{\partial u_1}{\partial s_1} − \cos θ_1 \frac{\partial v_1}{\partial s_1} & \sin θ_1 \frac{\partial u_1}{\partial s_2} − \cos θ_1 \frac{\partial v_1}{\partial s_2} & \cdots & \sin θ_1 \frac{\partial u_1}{\partial s_6} − \cos θ_1 \frac{\partial v_1}{\partial s_6} \\ \sin θ_2 \frac{\partial u_2}{\partial s_1} − \cos θ_2 \frac{\partial v_2}{\partial s_1} & \sin θ_2 \frac{\partial u_2}{\partial s_2} − \cos θ_2 \frac{\partial v_2}{\partial s_2} & \cdots & \sin θ_2 \frac{\partial u_2}{\partial s_6} − \cos θ_2 \frac{\partial v_2}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 − r_1 \\ d_2 − r_2 \\ \vdots \end{bmatrix} \quad (10)$$

Here, Equation (10) is expressed as in Equation (11).

[Equation 11]

$$JΔs = E \quad (11)$$

Calculation of the partial differential coefficients for calculating the coefficient matrix J of the linear simultaneous equation of Equation (11) can be performed by using a publicly known method. For example, the partial differential coefficients can be calculated by the method disclosed in V Lepetit and P. Fua, "Keypoint recognition using randomized trees", IEEE Transactions on Pattern Analysis and Machine Intelligence, vol. 28, no. 9, 2006.

In step S604, the reliability calculation unit 105 calculates the reliability w for an image edge feature associated with a model edge feature. Calculation of the reliability w is performed as described above. The matching unit 107 then obtains the reliability w calculated by the reliability calculation unit 105. When calculating the reliability w, it is possible to use the deterioration degree corresponding to the coarse position/orientation obtained in step S601. In contrast, when calculating the reliability w, a deterioration degree corresponding to the current position and orientation s of the three-dimensional model may be used.

The reliability w may be calculated in advance for all model edge features, and this reliability w, for example, may be held by the deterioration degree holding unit 102. In such a case, the matching unit 107 can obtain the reliability for the corresponding model edge feature as the reliability w for the image edge feature from the deterioration degree holding unit 102.

The reliability w for each image edge feature is used as the weight for each image edge feature in the calculation of the correction value Δs in step S605. In the following explanation, a weight matrix W shown in Equation (12), in which a corresponding image edge feature has reliability w for the detected for the image edge feature as a coefficient, is used.

[EQUATION 12]

$$W = \begin{bmatrix} w_1 & & & 0 \\ & w_2 & & \\ & & \ddots & \\ 0 & & & w_{N_c} \end{bmatrix} \quad (12)$$

The weight matrix W is a square matrix for which components other than diagonal elements are 0. The diagonal element is a reliability $w_i$ (i=1 to $N_c$) of each edge feature, and is used as the weight. $N_c$ is a total number of image edge features associated with the model edge feature.

Equation (11) is transformed by using the weight matrix W as in Equation (13).

[Equation 13]

$$WJ\Delta s = WE \quad (13)$$

In step S605, the matching unit 107 calculates the correction value Δs for the position and orientation of the three-dimensional model. In the present embodiment, the matching unit 107 calculates the correction value Δs by solving Equation (13). More specifically, Equation (13) can be solved as shown in Equation (14).

[Equation 14]

$$\Delta s = (J^T W J)^{-1} J^T W E \quad (14)$$

Solving Equation (13) as shown in Equation (14) corresponds to obtaining the difference for each row of Equation (13), i.e. obtaining the Δs1 to Δs6 that minimize the sum of squares of $w_i F_i$. Here, $F_i = (\sin \theta_i (\partial u_i / \partial s_1) - \cos \theta_i (\partial v_i / \partial s_1))\Delta s + \ldots - (d_i - r_i)$. Here, $F_i$ is calculated for each model edge feature, and can be considered as an evaluation value that illustrates a residual error of the distance between an image edge feature and a model edge feature on the captured image after the position and orientation of the three-dimensional model moves just Δs. In addition, $S = \Sigma (w_i F_i)^2$ is the sum of squares of the weighted residual error. Accordingly, solving Equation (13) as shown in Equation (14) corresponds to minimizing the evaluation function S obtained by weighting, by the reliability $w_i$, the evaluation value $F_i$, which indicates the fitting error, for each model edge feature. In other words, the correction value Δs of the position and orientation for which the degree of matching between the image of the three-dimensional model and the image of the target object becomes higher is obtained by the processing of step S605.

In step S606, the matching unit 107 uses the correction value Δs calculated in step S604 to update the position and orientation of the three-dimensional model to s+Δs. It is possible to correct the position and orientation s so that the distance between the feature of the three-dimensional model and the associated feature of the target object is small.

In step S607, the matching unit 107 determines whether the position and orientation of the three-dimensional model converges. When it is determined that the position and orientation has converged, the matching unit 107 outputs the position and orientation of the three-dimensional model at that time as an estimated position and orientation of the target object obtained by the fitting. The processing then terminates. If it is determined that the position and orientation are not converging, the processing returns to step S602, and the matching unit repeats performance of the processing of steps S602 to S606 until the position and orientation converge. To simplify the processing, the processing may return to step S603 when the position and orientation are not converging.

In the present embodiment, if the correction value Δs obtained in step S605 is less than or equal to a predetermined value and mostly does not change, the matching unit 107 determines that the position and orientation have converged. For example, if the correction value Δs continues to be less than or equal to the predetermined value for a predetermined number of times, the matching unit 107 can determine that the position and orientation have converged. A method of determining convergence is not limited to this method. For example, if the number of iterations of steps S602 to S606 has reached a predetermined number of times, the matching unit 107 may determine that the position and orientation have converged.

As explained above, the estimated position and orientation are calculated for the target object by the processing of steps of S601 to S606. In the above-described explanation, explanation was given of a case in which the three-dimensional position and orientation of the target object were calculated. However, in another embodiment, it is possible to calculate a two-dimensional position and orientation of the target object. In such a case, a three-dimensional vector having two elements that represent position and one element that represents orientation is used as the vector s. The method of calculating the position and orientation of the target object is not limited to the above described Gauss-Newton method. For example, it is possible to use a Levenberg-Marquardt method, which is more robust, and it is possible to use a steepest descent method, which is simpler. Furthermore, another nonlinear optimized calculation method, such as a conjugate gradient method or an ICCG method, can be used.

By the first embodiment described above, an image edge feature can be extracted at high precision by considering degradation of the captured image in accordance with bokeh, blur, and the like. The position and orientation of the target object are estimated by causing a model edge feature to fit an image edge feature while performing weighting of edge features in consideration of degradation of the captured image in accordance with bokeh, blur, or the like. Accordingly, it is possible to improve the precision of estimation of the position and orientation of the target object.

[First Variation]

In the first embodiment, the deterioration degree is set for each model edge feature. However, the deterioration degree may be set for each pixel or for each segmented area of the captured image. For example, between step S305 and step S306, the deterioration degree calculation unit 101 can project a model edge feature for which the deterioration degree has been calculated onto the captured image surface, and determine the position of the image of the model edge feature. For each pixel included in a segmented area of the captured image that includes the position of the image of the model edge feature, the deterioration degree holding unit 102 can set the deterioration degree calculated for this model edge feature.

In such a case, the reliability calculation unit 105 may use the deterioration degree to set a reliability for each pixel or each segmented area of the captured image. In such a variation, the matching unit 107 can perform fitting processing while using the reliability set for a pixel at which the image edge feature is detected as the reliability for the image edge feature.

[Second Variation]

In step S205 in the first embodiment, one filter is set, and this one filter is applied to the captured image on the whole. However, a plurality of filters may be used for one captured image. In other words, for each position of the captured image, the feature extraction unit 104 can set an extraction parameter used to extract a feature at this position in accordance with the deterioration degree of the image for this position.

For example, if the deterioration degree is set for each segmented area of the captured image as in the first variation, the feature extraction unit 104 can set the extraction filter by using the deterioration degree set for the pixel to which the filter is to be applied. For example, the feature extraction unit 104 can determine the size of the extraction filter as described above, by considering the bokeh amount D and the blur amount B, or by considering the deterioration degree $\sigma_0$. In this way, it is possible to extract the edge at higher precision by using a suitable extraction filter in accordance with a deterioration degree of each region of the captured image.

[Third Variation]

In the first embodiment, after an image edge feature was extracted in step S205, association of a model edge feature and the image edge feature was performed in step S206. However, configuration may be taken to omit step S205 and extract an image edge feature corresponding to the model edge feature in step S206.

More specifically, in step S602, the matching unit 107 searches for an image edge feature that is present on the search line 703. At this point, in the first embodiment an image edge feature is detected by referring to the edge intensity map, but in the present variation an image edge feature is detected by referring to the captured image. Specifically, the matching unit 107 calculates a luminance gradient of the captured image along the search line 703 in the captured image by performing a convolution calculation that uses the one-dimensional extraction filter set in step S403 with respect to a one-dimensional array of pixel values present on the search line 703. The matching unit 107 detects, as the image edge feature, a point for which the absolute value of the luminance gradient is an extreme value.

[Fourth Variation]

In the first embodiment the feature extraction unit 104 extracts an image edge feature referring to the deterioration degree. The matching unit 107 also estimates the position and orientation of the target object using a reliability defined based on a deterioration degree for weighting. However, it is not essential to use the deterioration degree for both the extraction of the image edge feature and the weighting. In the fourth variation, the feature extraction unit 104 refers to the deterioration degree and extracts the image edge feature similarly to in the first embodiment. However, the matching unit 107 estimates the position and orientation of the target object without performing weighting based on the reliability.

The information processing apparatus 1 according to the present variation has a similar configuration as in the first embodiment, excluding a point of not having the reliability calculation unit 105. Processing in the present variation is similar to in the first embodiment except for the processing of step S206. Explanation is given below regarding the processing of step S206 in the present variation with reference to the flowchart of FIG. 6.

Steps S601 to S603 are performed similarly to in the first embodiment. The processing of step S604 is omitted. In step S605, the matching unit 107 calculates the correction value Δs by solving Equation (11). More specifically, Equation (11) can be solved as shown in Equation (15).

[Equation 15]

$$\Delta s = (J^T J)^{-1} J^T E \quad (15)$$

In the present variation, an image edge feature can be extracted at high precision by considering degradation of the captured image in accordance with bokeh, blur, and the like. Thereby, it is possible to improve the precision of estimation of the position and orientation of the target object based on the extracted image edge feature.

[Fifth Variation]

In the fifth variation, the matching unit 107, similarly to in the first embodiment, estimates the position and orientation of the target object using a reliability defined based on a deterioration degree for weighting. However, the feature extraction unit 104 extracts the image edge feature by applying a predetermined extraction filter to the captured image without using a deterioration degree.

The information processing apparatus 1 according to the present variation has a configuration similar to in the first embodiment. Processing in the present variation is similar to in the first embodiment except for the processing of step S205. In step S205 of the present variation, the feature extraction unit 104 extracts the image edge feature by applying a filter to the obtained image. The filter used is not particularly limited, and for example, a differential filter of an optional shape can be used.

In the present variation, the position and orientation of the target object are estimated by causing a model edge feature to fit an image edge feature while performing weighting of edge features in consideration of degradation of the captured image in accordance with bokeh, blur, or the like. Accordingly, it is possible to improve the precision of estimation of the position and orientation of the target object.

[Sixth Variation]

The feature extraction unit 104 in the first embodiment sets a filter for extracting an edge feature based on a deterioration degree, and extracts the image edge feature by applying the set filter to the captured image. In the sixth variation, the filter for extracting the image edge feature is fixed. However, the filter is applied after the size of the captured image is changed.

Figure 9:
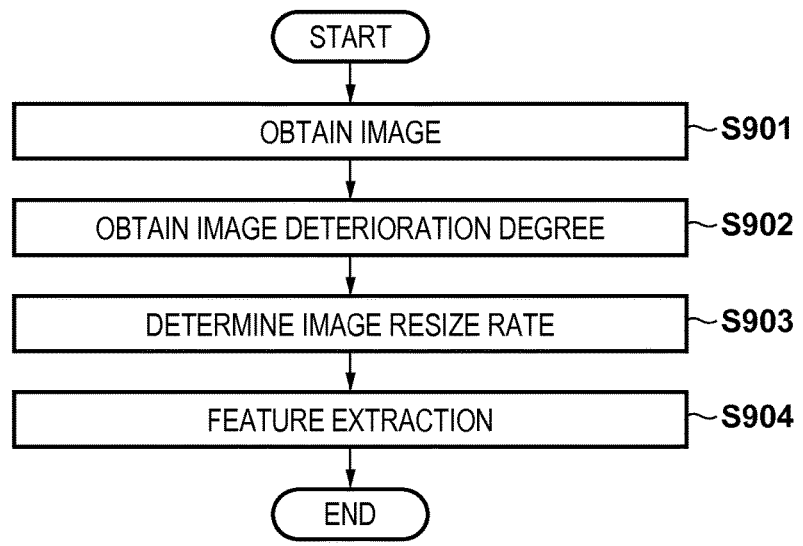
FIG. 9 is a flowchart of feature extraction processing according to a sixth variation.

The information processing apparatus 1 according to the present variation has a configuration similar to in the first embodiment. Processing in the present variation is similar to in the first embodiment except for the processing of step S205. Explanation is given below regarding the processing of step S205 in the present variation with reference to the flowchart of FIG. 9. The processing of step S901 and step S902 is similar to step S401 and step S402, respectively.

In step S903, the feature extraction unit 104 sets a resizing rate for the captured image in accordance with the deterioration degree obtained in step S902. In the present variation, the resizing rate is calculated so that the captured image becomes small to the extent that the deterioration degree (for example the bokeh amount D and the blur amount B) is large.

As a detailed example, similarly to in the first embodiment, the feature extraction unit 104 uses the bokeh amount D and the blur amount B to estimate a waveform S of the image of the model edge feature on the captured image. Next, the feature extraction unit 104 sets a resizing rate R so that the waveform S is within a predetermined spread. In the present variation, the feature extraction unit 104 calculates a standard deviation Z of the waveform S, and calculates the resizing rate R=E/Z such that the standard deviation becomes a predetermined value E. Here, the predetermined value E is a value defined in accordance with a filter for extracting an image edge feature. In the present variation, as the filter for extracting the image edge feature, a filter in accordance with a waveform obtained by differentiating a Gaussian function of the standard deviation E is used. A method of setting the resizing rate R is not limited to this method. For example, to reduce the computational complexity, configuration may be taken such that R=E/(D+B). Even in this case, the resizing rate R is calculated so that the captured image becomes small to the extent that the bokeh amount D and the blur amount B are large.

In step S904, the feature extraction unit 104 extracts an image edge feature from the captured image obtained by the image obtaining unit 103, based on the resizing rate R set in step S903. More specifically, firstly the feature extraction unit 104 resizes the captured image in accordance with the resizing rate R. If the resizing rate R is greater than 1, the captured image is magnified. Next, the feature extraction unit 104 extracts an image edge feature by applying a filter that is prepared in advance to the resized captured image. The coordinates of an image edge feature detected from the resized captured image can be converted into coordinates of the image edge feature on the captured image before the resizing by referring to the resizing rate and, for example, multiplying by 1/R.

In the method of the present variation, an image edge feature can be extracted at high precision by considering degradation of the captured image in accordance with bokeh, blur, and the like. Thereby, it is possible to improve the precision of estimation of the position and orientation of the target object based on the extracted image edge feature.

[Seventh Variation]

In the first embodiment a filter for extracting an image edge feature based on a deterioration degree is set, and the image edge feature is extracted by applying the set filter to the captured image. In the seventh variation, the extraction parameter is set based on the deterioration degree. Specifically, a plurality of filters are set, and the plurality of filters are used to extract the image edge feature.

In the present variation, it is considered that the bokeh amount D and the blur amount B that the deterioration degree calculation unit 101 calculates can include an error. Accordingly, the feature extraction unit 104 sets a plurality of bokeh amount D±ΔD based on the bokeh amount D that the deterioration degree calculation unit 101 calculated. Similarly, the feature extraction unit 104 sets a plurality of blur amount B±ΔB based on the blur amount B that the deterioration degree calculation unit 101 calculated. The feature extraction unit 104 uses each combination of the bokeh amount D±ΔD and the blur amount B±ΔB to set a filter for extracting the image edge feature, and extract the image edge feature from the captured image. Furthermore, the feature extraction unit 104 selects at least one extraction result from a plurality of extraction results in accordance with a response value of the filter processing. Specifically, the feature extraction unit 104 determines and outputs an extraction result for which an extraction precision is assumed to be relatively high, by comparing the response value of the filter.

Figure 10:
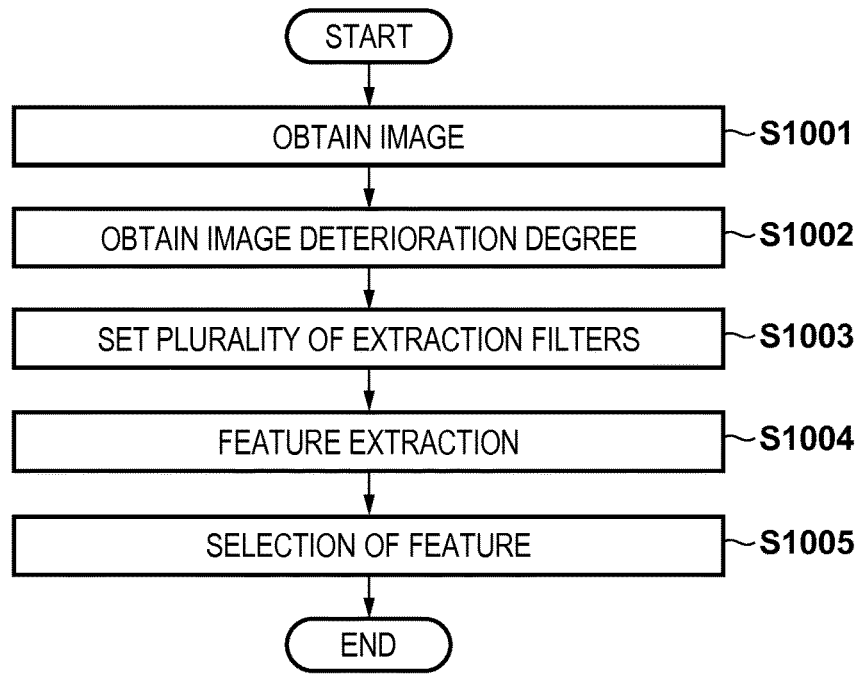
FIG. 10 is a flowchart of feature extraction processing according to a seventh variation.

The information processing apparatus 1 according to the present variation has a configuration similar to in the first embodiment. Processing in the present variation is similar to in the first embodiment except for the processing of step S205. Explanation is given below regarding the processing of step S205 in the present variation with reference to the flowchart of FIG. 10. The processing of step S1001 and step S1002 is similar to step S401 and step S402, respectively.

In step S1003, the feature extraction unit 104 sets a plurality of extraction filters based on deterioration degrees obtained in step S1002. Firstly, the feature extraction unit 104 applies a change in a predetermined range (ΔD, ΔB) with respect to the bokeh amount D and the blur amount B. Specifically, a plurality of bokeh amounts and blur amounts are set in the ranges of D±ΔD and B±ΔB. The variation range of the bokeh amount D and the blur amount B and the number of bokeh amounts and blur amounts set may be set in advance. Next, by combining the set plurality of bokeh amounts and blur amounts, the feature extraction unit 104 sets the plurality of extraction filters. Setting of the extraction filters can be performed similarly to in the first embodiment.

In step S1004, the feature extraction unit 104 uses each of the plurality of extraction filters set in step S1003 to extract an image edge feature from the captured image obtained by the image obtaining unit 103. Thus, the plurality of extraction results for the image edge feature are obtained in accordance with each extraction filter.

Next, the feature extraction unit 104 selects from the extracted image edge features an image edge feature for which the extraction precision is assumed to be relatively high. In the present variation, an extraction result for which a response value of a filter is large is selected. More specifically, an image edge feature for which an extreme value of the luminance gradient calculated by applying the extraction filter is larger is selected. As a specific example, the feature extraction unit 104 selects an image edge feature for which the extraction precision is assumed to be relatively high from a group of image edge features that are present at the same position and are extracted using differing extraction filters. Specifically, from a plurality of neighboring edge features included in a predetermined range E[pixel], the feature extraction unit 104 selects an edge feature for which an extreme value of the luminance gradient which is a response value of a respective extraction filter is maximum. The feature extraction unit 104 may select two or more edge features.

According to the method of the present variation, an image edge feature can be extracted at high precision by considering degradation of the captured image in accordance with bokeh, blur, and the like. Furthermore, by using a plurality of extraction filters that consider error of bokeh and blur, it is possible to extract the image edge feature with a high precision in comparison to a case of using one type of extraction filter. Thereby, it is possible to improve the precision of estimation of the position and orientation of the target object based on the extracted image edge feature.

In the present variation, explanation was given for a method of setting a plurality of extraction filter shapes. However, as shown in the sixth variation, a plurality of image resizing rates may be set. In such a case, the plurality of detection results for the image edge feature are obtained in accordance with each resizing rate. Also, an image edge feature for which an extreme value of the luminance gradient calculated by applying the extraction filter to the captured image after resizing is larger is selected.

[Eighth Variation]

In the first embodiment, the deterioration degree calculation unit 101 calculates the deterioration degree by a simulation that considers image capturing conditions according to the image capturing apparatus 108 and a three-dimensional model of the target object. In the eighth variation, the deterioration degree is calculated from the captured image obtained by the image capturing apparatus capturing the target object. The following processing is performed on a plurality of captured images of the target object, which are captured while changing the relative position and orientation of the target object with respect to the image capturing apparatus. The deterioration degree calculated by using each captured image is held by the deterioration degree holding unit 102 in association with the relative position and orientation of the target object with respect to the image capturing apparatus.

Figure 11:
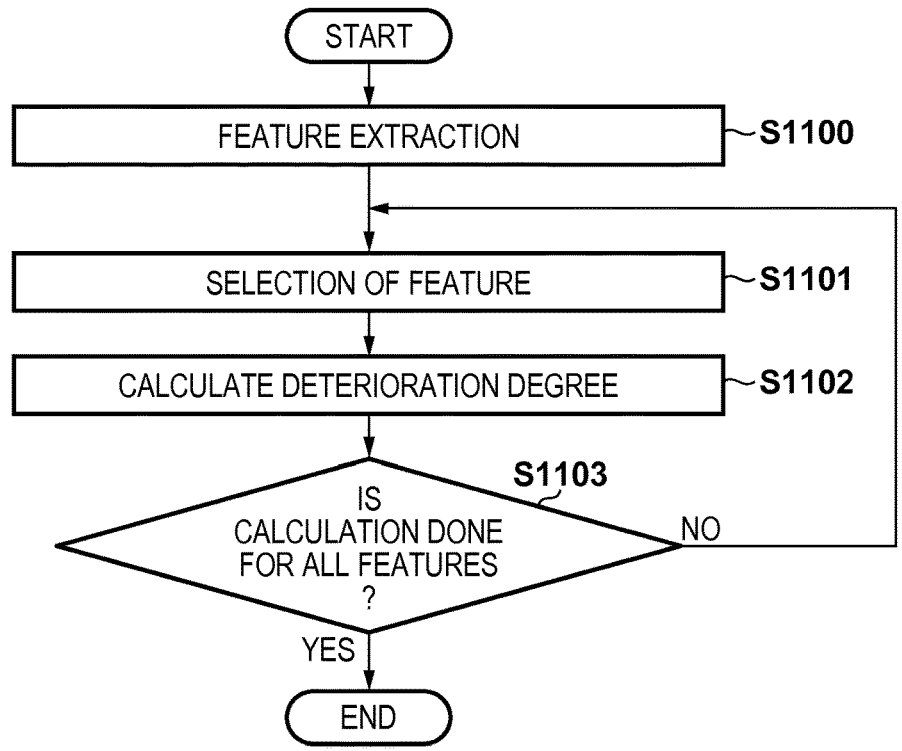
FIG. 11 is a flowchart of deterioration degree calculation processing according to an eighth variation.

Configuration and Processing of the information processing apparatus 1 according to an eighth variation is similar to in the first embodiment, except for the processing of step S202. Explanation is given below regarding the processing of step S202 in the eighth variation with reference to the flowchart of FIG. 11.

In step S1100, the deterioration degree calculation unit 101 extracts a plurality of edge features from a captured image of the target object obtained by the image obtaining unit 103. The method for extracting the edge features is not particularly limited, and for example, an optional differential filter can be used. In step S1101, the deterioration degree calculation unit 101 selects one edge feature from the plurality of edge features extracted in step S1100.

In step S1102, the deterioration degree calculation unit 101 calculates a deterioration degree of the edge feature selected in step S1101. In the present variation, the deterioration degree calculation unit 101 calculates the deterioration degree of the edge feature based on the position of the edge feature and the normal direction of the edge. As a detailed example, by using Equation (16), the deterioration degree calculation unit 101 estimates the luminance value at a pixel of interest on the edge feature in a case where it is assumed that the captured image is degraded in accordance with the deterioration degree σ.

[EQUATION 16]

$$\mathrm{erf}(r, \theta, \sigma) = \frac{2}{\sqrt{\pi}} \int_{-t}^{t} \exp\left(-\frac{(r\cos\theta - x_0)^2 + (r\sin\theta - y_0)^2}{\sigma^2}\right) dr \quad (16)$$

In Equation (16), $x_0$, $y_0$ are the position of a pixel of interest where the edge feature is present, r expresses a distance from the position of a pixel of interest, and θ expresses a normal direction (two-dimensional) of the edge feature. In addition, t expresses a search range from the position of a pixel of interest, and σ is the deterioration degree. The value of the deterioration degree σ corresponds to a value in which the bokeh amount and the blur amount are unified. t indicates an optional positive value.

As shown in Equation (17), the sum of squares of the difference between a luminance value on the captured image and a luminance value at the same position calculated in accordance with Equation (16) for each pixel that constitutes the edge feature is made to be an evaluation function E. The deterioration degree calculation unit 101 then estimates a parameter σ by minimizing the evaluation function E by an iterative calculation. For the minimization of the evaluation function E a publicly known method can be used; for example, a steepest descent method, a Levenberg-Marquardt method, or the like can be used. In Equation (17), I(x, y) shows a luminance value of the captured image at the coordinates (x, y).

[EQUATION 17]

$$E = \sum_y \sum_x \{I(x, y) - \mathrm{erf}(r, \theta, \sigma)\}^2 \quad (17)$$

In step S1103, the deterioration degree calculation unit 101 determines whether the deterioration degree is calculated for all edge features. If the calculation of the deterioration degree is not completed for all edge features, the processing returns to step S1101, and the deterioration degree is calculated for the next edge feature. When the calculation of the deterioration degree for all edge features terminates, the processing of step S202 terminates. In such a case, the deterioration degree holding unit 102 can hold the deterioration degree for each pixel or for each segmented area of the captured image, similarly to in the first variation. For example, for each pixel included in a segmented area of the captured image that includes the position of the image of the extracted edge feature, the deterioration degree calculated for this edge feature can be set.

As discussed above, according to the method of the present variation, it is possible to calculate the deterioration degree from the image that captures the target object. Thereby, it is possible to more accurately calculate the deterioration degree by considering an effect that cannot be fully expressed by only image capturing parameters of the image capturing apparatus 108 and the three-dimensional model of the target object, or the like, e.g. an effect due to noise. By referring to this deterioration degree, it is possible to extract an image edge feature at high precision, and in addition, it is possible to cause a model edge feature to fit the image edge feature while performing weighting with respect to the edge feature. Accordingly, it is possible to improve the precision of estimation of the position and orientation of the target object.

Instead of using Equation (16), it is possible to estimate the luminance value at a pixel of interest on an edge feature when it is assumed that the captured image is degraded in accordance with the bokeh amount D and the blur amount B. In such a case, the deterioration degree calculation unit 101 can estimate the bokeh amount D and the blur amount B instead of the deterioration degree σ.

[Ninth Variation]

In the eighth variation, the deterioration degree is calculated from the captured image of the target object. In the ninth variation, based on image capturing conditions for the target object according to the image capturing apparatus, the captured image obtained by the image capturing apparatus capturing the target object is estimated by using the three-dimensional model of the target object. More specifically, processing that reproduces (restores) the degradation in the image obtained by projecting the three-dimensional model on the captured image is performed. In this processing, the three-dimensional model of the target object and the image capturing condition according to the image capturing apparatus 108 are referred to. The processing in the present variation is similar to an eighth variation, except in that step S1100 is different. Explanation is given below of the processing of step S1100.

In step S1100, the deterioration degree calculation unit 101 projects the three-dimensional model of the target object onto the captured image. The deterioration degree calculation unit 101 then performs processing that reproduces the degradation with respect to the image for which projection is performed. In the present variation, the deterioration degree calculation unit 101 generates an image that reproduces the bokeh and the blur.

Explanation is given below of an example of a method that reproduces the bokeh and the blur. Firstly, for each pixel of the projection image, the deterioration degree calculation unit 101 calculates the bokeh amount D and the blur amount B on the projection image based on the three-dimensional position on the three-dimensional model corresponding to the pixel. The bokeh amount D can be calculated in accordance with Equation (2), by using the three-dimensional position corresponding to the respective pixel of the projection image.

The blur amount B can be calculated as follows. Firstly, a blur amount $B_{3D}$ in a three-dimensional space is calculated. The blur amount $B_{3D}$ can be obtained in accordance with $B_{3D} = t_i J3DV$. Here, $J_{3D}$ is a Jacobian of a three-dimensional position corresponding to a respective pixel of the projection image; $t_i$ is the exposure time; V is the relative speed of the target object with respect to the image capturing apparatus 108. The Jacobian $J_{3D}$ is a value that expresses a rate at which a three-dimensional position corresponding to a respective pixel of the projection image changes when a position and orientation six-degrees-of-freedom parameter has slightly changed. The Jacobian $J_{3D}$ can be calculated in accordance with Equation (18) and Equation (19).

[EQUATION 18]

$$J_{3D} = \begin{bmatrix} \frac{\partial err_{3D}}{\partial s_1} & \frac{\partial err_{3D}}{\partial s_2} & \frac{\partial err_{3D}}{\partial s_3} & \frac{\partial err_{3D}}{\partial s_4} & \frac{\partial err_{3D}}{\partial s_5} & \frac{\partial err_{3D}}{\partial s_6} \end{bmatrix} \quad (18)$$

[EQUATION 19]

$$err_{3D} = (x' - x) + (y' - y) + (z' - z) \quad (19)$$

In Equation (18), s indicates the position and orientation of the target object. In addition, $err_{3D}$ indicates a movement vector of the three-dimensional position during exposure, when the three-dimensional position at the start of exposure is (x, y, z) and the three-dimensional position at the end of exposure is (x', y', z').

It is possible to calculate the blur amount B (a two-dimensional vector) on the projection image by projecting the blur amount $B_{3D}$ (a three-dimensional vector) in the three-dimensional space onto the projection image.

Next, the deterioration degree calculation unit 101 generates, based on the obtained bokeh amount D and blur amount B, an image in which the bokeh and the blur are reproduced from the projection image. More specifically, the deterioration degree calculation unit 101 generates an image in which the bokeh and the blur are reproduced by performing for each pixel of the projection image a convolution calculation with a Gaussian function of a standard deviation D, as well as a convolution calculation with a rectangular wave having width B and height 1.

Subsequently, the deterioration degree calculation unit 101 extracts a plurality of edge features from the obtained image in which the bokeh and the blur are reproduced. Except for the using of the image in which the bokeh and the blur are reproduced instead of the captured image of the target object, this processing can be performed similarly to in the eighth variation.

As described above, according to the method of the present variation, an image in which the bokeh and the blur are reproduced is generated based on image capturing conditions such as the relative position and orientation of the target object with respect to the image capturing apparatus 108 and the exposure time, in addition to the three-dimensional model of the target object. The deterioration degree is then is calculated based on this image. By referring to this deterioration degree, it is possible to extract an image edge feature at high precision, and in addition, it is possible to cause a model edge feature to fit the image edge feature while performing weighting with respect to the edge feature. Accordingly, it is possible to improve the precision of estimation of the position and orientation of the target object.

The method of generation of the image in which the degradation is reproduced is not limited to the method described above. For example, it is possible to use a method that reproduces the bokeh and blur by using an image filter, such as is disclosed in chapter 6 of Kazuyuki Tanaka, "Introduction of Image Processing Techniques by Probabilistic Models".

[Second Embodiment]

In the first embodiment, the position and orientation of the target object are estimated by causing image coordinates of a model edge feature of a three-dimensional model of a target object projected onto a captured image surface to fit image coordinates of an image edge feature extracted from the captured image. In the second embodiment, the position and orientation of the target object are estimated by causing three-dimensional coordinates of a feature (for example, a surface) of a three-dimensional model of the target object to fit three-dimensional coordinates of a feature (for example, a three-dimensional point) calculated from the captured image.

Figure 12:
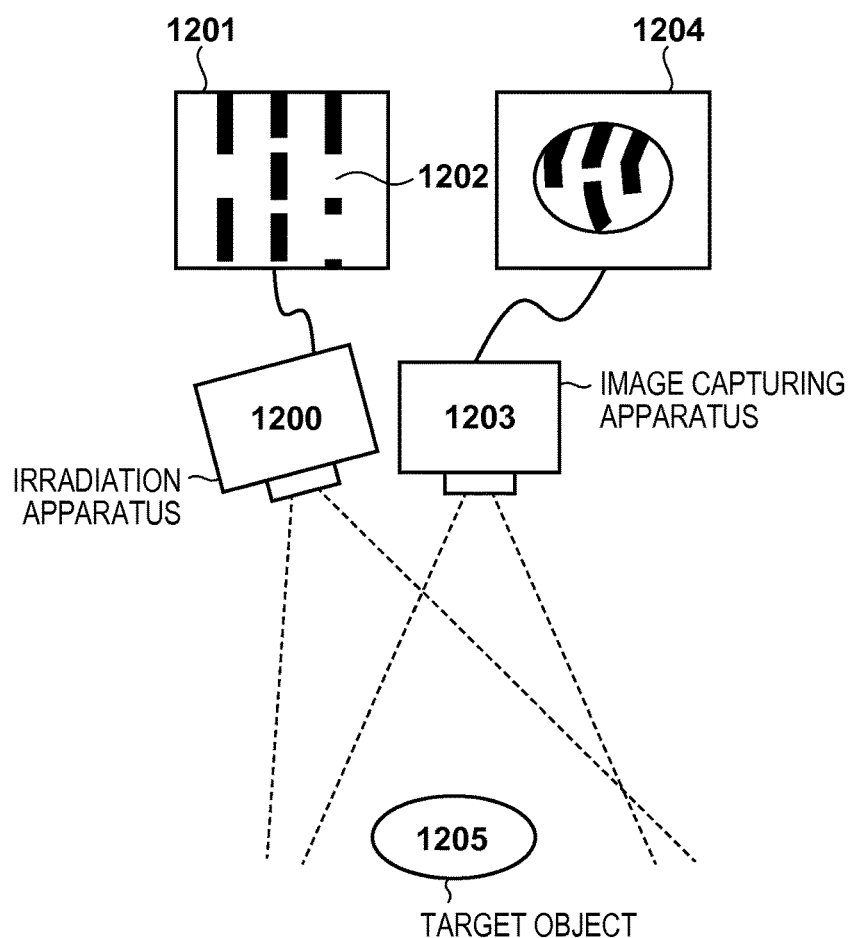
FIG. 12 is a view showing a method of measuring a three-dimensional position of a target object.

In the present embodiment, the feature extraction unit 104 calculates a three-dimensional position of a feature on an image of the target object, based on a captured image obtained by the image capturing apparatus capturing the target object. More specifically, the feature extraction unit 104 calculates the three-dimensional position of a point on the image of the target object. The three-dimensional position, for example, can be measured by irradiating an illumination pattern onto the target object. In the present embodiment, as shown in FIG. 12, an illumination pattern 1201 is projected on a target object 1205 from an irradiation apparatus 1200. An image capturing apparatus 1203 is then used to capture the target object 1205 on which the illumination pattern 1201 is projected. In the present embodiment, the illumination pattern 1201, which includes a plurality of dotted lines, is projected.

A three-dimensional position of an object surface on which the illumination pattern 1201 is projected is calculated based on the illumination pattern 1201, a captured image 1204, and the position relation between the irradiation apparatus 1200 and the image capturing apparatus 1203. More specifically, a position of a feature of interest in the illumination pattern 1201 projected by the irradiation apparatus 1200, a position on the captured image 1204 at which the projected the feature of interest was extracted, and a relative position and orientation of the image capturing apparatus 1203 with respect to the irradiation apparatus 1200 are obtained. Here, the position of the feature of interest in the illumination pattern 1201 corresponds to a projection direction of the feature of interest from the irradiation apparatus 1200, and the position on the captured image 1204 at which the projected feature of interest is extracted corresponds to an observation direction of the feature of interest from the image capturing apparatus 1203.

Accordingly, it is possible to calculate the three-dimensional position of the feature of interest in accordance with a principle of a triangulation method.

In the present embodiment, the feature is extracted from the captured image 1204. In the present embodiment, the illumination pattern 1201 includes a plurality of measurement lines 1202, and the feature extracted from the illumination pattern 1201 that appears in the captured image 1204 is a point on a line segment. An example of a method of extracting the point on the line segment is explained below. Firstly, a luminance gradient distribution is obtained by applying a differential filter to the captured image 1204. A line segment configured by a point at which the luminance gradient is an extreme value is extracted. Furthermore, the luminance gradient distribution on the line segment is obtained by applying the differential filter on the thus extracted line segment. The point at which the luminance gradient on the line segment becomes an extreme value is then extracted as the feature. Thus, it is possible to extract a feature from the captured image 1204, and obtain the position of the feature. The position of the feature in the illumination pattern 1201 may be defined in advance. Configuration may be taken to use a similar method to extract a feature in the illumination pattern 1201 and obtain the position of the feature.

Figure 13:
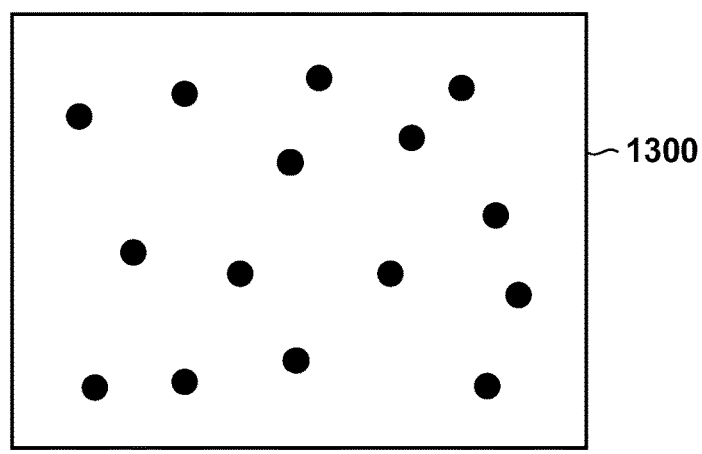
FIG. 13 is a view for showing an example of an illumination pattern.

A type of the illumination pattern 1201 is not particularly limited if it is possible to extract a feature included in the illumination pattern 1201 from the target object 1205 on which the illumination pattern 1201 is projected. For example, there is no necessity for the illumination pattern 1201 to include a line, and the illumination pattern 1201 may include any geometric shape. As an example, FIG. 13 shows an illumination pattern 1300 that includes a plurality of points as features.

The method of calculating the three-dimensional position is not limited to the above described method. It is possible to use any method that can calculate the three-dimensional position on a face of the target object 1205 based on an image obtained by capturing the target object 1205. For example, it is possible to capture the target object 1205 by using a plurality of image capturing apparatuses arranged at different positions. In such a case, it is possible to calculate the three-dimensional position of a feature of interest through a principle of a triangulation method, by using relative positions and orientations of the image capturing apparatuses and the position of the feature of interest extracted from each captured image. Furthermore, it is possible to calculate the three-dimensional position for the point on the image of the target object via the above method.

Figure 2:
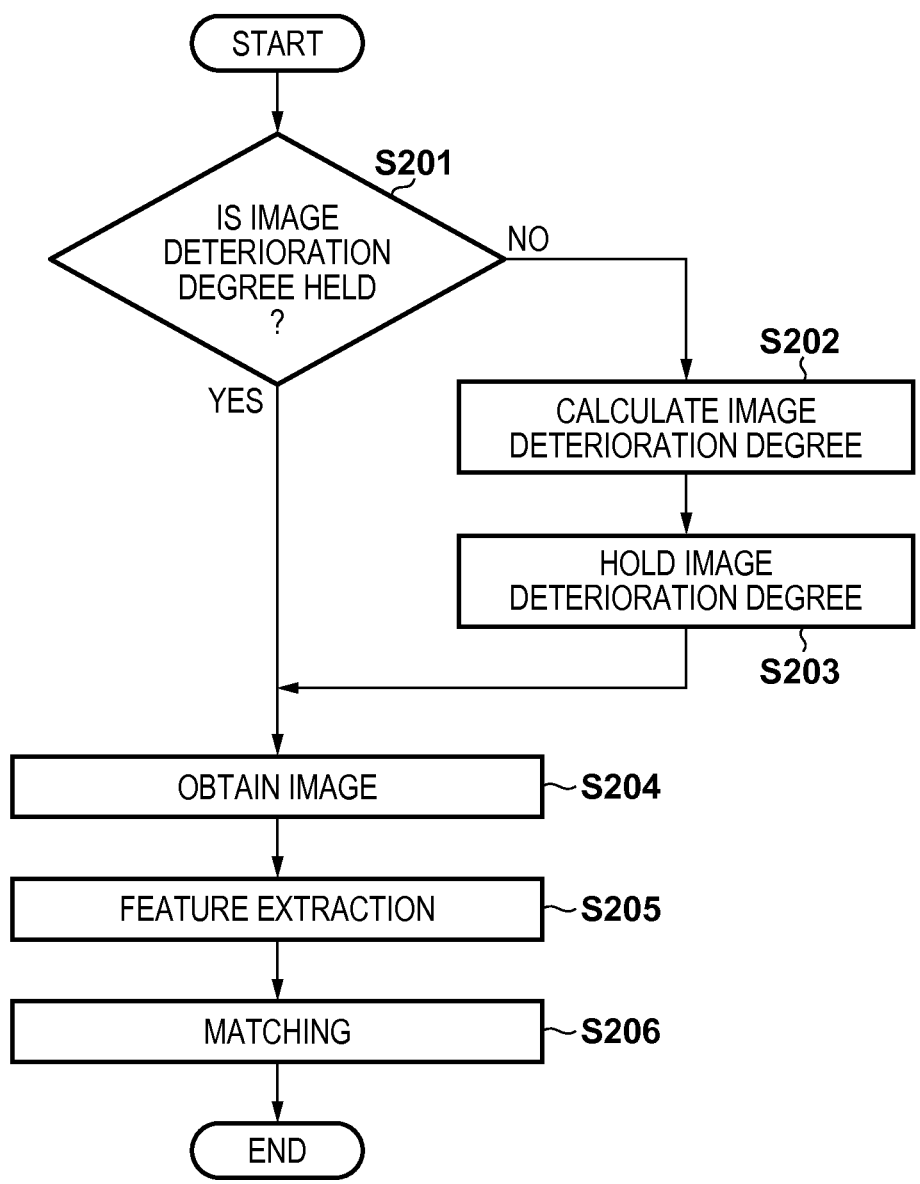
FIG. 2 is a flowchart of processing according to the first embodiment.

Next, explanation is given regarding processing performed in the present embodiment with reference to the flowchart of FIG. 2. The information processing apparatus 1 according to the present embodiment has a similar configuration to that of the first embodiment, and explanation is given below regarding points of difference. In the present embodiment, the model holding unit 106 holds the three-dimensional model of the target object 1205. The three-dimensional model of the target object 1205 that the model holding unit 106 holds is, for example, comprised by information that indicates a position of a group of surfaces or a group of points positioned on a face of the target object 1205. Explanation is given below of a case when the three-dimensional model of the target object 1205 is comprised by a group of surfaces.

Step S201 is performed similarly to in the first embodiment. Step S202 and step S203 are performed similarly to in the first embodiment, except that a deterioration degree is calculated and held for each point on a face of a three-dimensional model instead of calculating a deterioration degree for each model edge feature. The calculation of a deterioration degree for a point, can be performed similarly to the calculation of a deterioration degree for a model edge feature. For example, the deterioration degree calculation unit 101 can calculate a bokeh amount by using image capturing conditions of the image capturing apparatus 1203, as well as a distance between the point and the image capturing apparatus 1203, or the like. The deterioration degree calculation unit 101 can calculate a movement amount on a captured image surface of the point during an exposure time as the blur amount. Configuration may be taken so that the deterioration degree calculation unit 101 and the deterioration degree holding unit 102 calculate and hold a deterioration degree for each surface of the three-dimensional model.

In step S204, the feature extraction unit 104 obtains the captured image 1204 obtained by capturing the target object 1205 on which the illumination pattern 1201 is projected, as described above. In step S205, the feature extraction unit 104 extracts a three-dimensional point as described above from the captured image obtained in step S204, and records the three-dimensional position of the three-dimensional point. Below, the extracted three-dimensional point is referred to as a measurement feature.

Below, explanation is given in detail of the processing in step S206, with reference to the flowchart of FIG. 6. The processing of step S606 and step S607 is similar to the first embodiment, and the explanation is omitted.

In step S601, the matching unit 107 performs initialization processing. Firstly, the matching unit 107 obtains the three-dimensional model of the target object 1205 from the model holding unit 106. Also, the matching unit 107 obtains a coarse position/orientation of the target object 1205, and sets it as the position and orientation s of the three-dimensional model.

In step S602, the matching unit 107 associates the three-dimensional point extracted in step S205 and the feature on the three-dimensional model obtained in step S601. In the present embodiment, for each measurement feature, the matching unit 107 detects a surface in the three-dimensional model image for which the distance is closest. The matching unit 107 then associates the detected surface with the measurement feature. Below, the surface of the three-dimensional model associated with the measurement three-dimensional point is referred to as a model feature.

In steps S603 to S605, the matching unit 107 uses a Gauss-Newton method to calculate the position and orientation of the target object, similarly to in the first embodiment. Specifically, the matching unit 107 repeatedly updates the relative position and orientation of the three-dimensional model with respect to the viewpoint so that the degree of matching between the image of the target object and the image of the three-dimensional model becomes larger. In the present embodiment too, the degree of matching is obtained based on a difference with a corresponding model feature for each measurement feature, which is weighted in accordance with a deterioration degree corresponding to the position at which the measurement feature was extracted. The difference between a measurement feature and a model feature is the distance between the three-dimensional position of the measurement feature and the three-dimensional position of the model feature. The matching unit 107, similarly to in the first embodiment, calculates a degree of matching with the image of the target object for a plurality of three-dimensional model images obtained by changing the position and orientation. From the plurality of three-dimensional model images, the three-dimensional model image that provides the highest degree of matching may be determined to be the three-dimensional model image corresponding to the image of the target object.

In step S603, the matching unit 107 calculates a coefficient matrix and an error vector, as follows. Each element of the coefficient matrix is a first-order partial differential coefficient corresponding to a slight change of the position and orientation of the three-dimensional model for the coordinates of the measurement feature, and more specifically is a partial differential coefficient of three-dimensional coordinates. The error vector is a distance in a three-dimensional space between a measurement feature and a model feature.

Three-dimensional coordinates of a group of points in a camera coordinate system, e.g. a coordinate system based on a position and an optical axis direction of the image capturing apparatus 1203, are converted into three-dimensional coordinates (x, y, z) in a coordinate system of the target object 1205 by using the position and orientation s of the target object 1205. Here, the three-dimensional coordinates of a measurement feature in the camera coordinate system are converted into three-dimensional coordinates ($x_0$, $y_0$, $z_0$) in the target object coordinate system, according to the coarse position/orientation of the target object 1205. (x, y, z) is changed by the position and orientation s of the target object 1205, and can be approximated as in Equation (20) by a first order Taylor expansion in the neighborhood of ($x_0$, $y_0$, $z_0$).

[EQUATION 20]

$$x \approx x_0 + \sum_{i=1}^{6} \frac{\partial x}{\partial s_i} \Delta s_i \qquad (20)$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

An equation in a model coordinate system of a model feature associated with a measurement feature is configured to be $a_x + b_y + c_z = e(a^2 + b^2 + c^2 = 1$; a, b, c and e are constants). If the position and orientation s of the target object 1205 is accurate, when the three-dimensional coordinates (x, y, z) of a measurement feature in the camera coordinate system are converted to three-dimensional coordinates in the target object coordinate system, it can be considered that the three-dimensional coordinates after conversion satisfy the above described equation. If this is assumed, Equation (21) is obtained by substituting Equation (20) into the equation of the surface, $a_x + b_y + c_z = e(a^2 + b^2 + c^2 = 1)$.

[EQUATION 21]

$$a \sum_{i=1}^{6} \frac{\partial x}{\partial s_i} \Delta s_i + b \sum_{i=1}^{6} \frac{\partial y}{\partial s_i} \Delta s_i + c \sum_{i=1}^{6} \frac{\partial z}{\partial s_i} \Delta s_i = e - q \qquad (21)$$

$$q = ax_0 + by_0 + cz_0$$

In Equation (21) q is a constant.

Equation (21) holds true for all measurement features for which a corresponding model feature is detected in step S602. Accordingly, a linear simultaneous equation for $\Delta s_i$, as in Equation (22), holds true.

[EQUATION 22]

$$\begin{bmatrix} a_1\frac{\partial x_1}{\partial s_1} + b_1\frac{\partial y_1}{\partial s_1} + c_1\frac{\partial z_1}{\partial s_1} & a_1\frac{\partial x_1}{\partial s_2} + b_1\frac{\partial y_1}{\partial s_2} + c_1\frac{\partial z_1}{\partial s_2} & \cdots & a_1\frac{\partial x_1}{\partial s_6} + b_1\frac{\partial y_1}{\partial s_6} + c_1\frac{\partial z_1}{\partial s_6} \\ a_2\frac{\partial x_2}{\partial s_1} + b_2\frac{\partial y_2}{\partial s_1} + c_2\frac{\partial z_2}{\partial s_1} & a_2\frac{\partial x_2}{\partial s_2} + b_2\frac{\partial y_2}{\partial s_2} + c_2\frac{\partial z_2}{\partial s_2} & \cdots & a_2\frac{\partial x_2}{\partial s_6} + b_2\frac{\partial y_2}{\partial s_6} + c_2\frac{\partial z_2}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} e_1 - q_1 \\ e_2 - q_2 \\ \vdots \end{bmatrix} \qquad (22)$$

In Equation (22), the matrix on the left side is a coefficient matrix, and the matrix on the right side is an error vector. In this way, the matching unit 107 calculates the coefficient matrix and the error vector.

In step S604, the reliability calculation unit 105 calculates the reliability for each measurement feature. Calculation of the reliability can be performed similarly to in the first embodiment. For example, the reliability calculation unit 105 obtains a corresponding deterioration degree for each measurement feature from the deterioration degree holding unit 102. In the present embodiment, from respective points on a face of the three-dimensional model for which a deterioration degree are calculated, it is possible to obtain the deterioration degree for a point that is closest to the three-dimensional position of a measurement feature as the deterioration degree for the measurement feature. The reliability calculation unit 105 calculates an average of the deterioration degrees for the each of the measurement features, and further calculates the reliabilities for the respective measurement features by using Equation (1). In the present embodiment, c of Equation (1) is the average of the deterioration degrees for the measurement features, and b is the deterioration degree for a measurement feature. The method of calculating the reliability is not limited to this method, and it is possible to use various methods as explained in the first embodiment. In addition, configuration may be taken to divide a three-dimensional space into a plurality of regions, calculate a statistic of the deterioration degree for the measurement features for each segmented area, and express the reliability by a function that has the calculated statistic as a parameter.

The calculated reliability is used as the weight for each measurement feature. In the following explanation, as explained in the first embodiment, the weight matrix W is defined based on reliability, as in Equation (12). The weight matrix W is a square matrix for which components other than diagonal elements are 0. A diagonal element is the weight for each model feature, i.e. the reliability $w_i$ (i=1 to $N_c$). $N_c$ is a total number of model features associated with the measurement feature. Similarly to in the first embodiment, Equation (11) is transformed by using the weight matrix W as in Equation (13). In step S605, the reliability calculation unit 105 obtains the correction value Δs by solving Equation (13) as in Equation (14). The correction value Δs of the position and orientation for which the degree of matching between the image of the three-dimensional model and the image of the target object becomes higher is obtained by the processing of step S605.

As explained above, the position and orientation of the target object is estimated by the processing of steps S601-S607.

In the present embodiment, explanation is given for a case when the three-dimensional model of the target object 1205 is comprised by a group of surfaces. However, the three-dimensional model of the target object 1205 may be configured by a group of points. In such a case, in step S602 it is possible to associate a point of the three-dimensional model for which the distance is closest for each measurement feature. It is then possible to obtain the correction value Δs of the position and orientation of the target object 1205, so that the evaluation function obtained by weighting the distance between corresponding points with the reliability is minimum.

By the second embodiment explained above, the position and orientation of the target object is estimated by causing a model feature to fit a measurement feature while performing weighting with respect to the measurement feature considering degradation of the captured image in accordance with the bokeh, the blur, and the like. Accordingly, it is possible to improve the precision of estimation of the position and orientation of the target object.

[Third Embodiment]

In the first embodiment, the position and orientation of the target object are estimated by causing image coordinates of a model edge feature of a three-dimensional model of a target object projected onto a captured image surface to fit image coordinates of an image edge feature extracted from the captured image. In the second embodiment, the position and orientation of the target object are estimated by causing three-dimensional coordinates of a model feature (for example, a surface) of a three-dimensional model of the target object to fit three-dimensional coordinates of a measurement feature (for example, a three-dimensional point) calculated from the captured image. In the third embodiment, by combining the first and second embodiments, the position and orientation of the target object is estimated by using both fitting of image coordinates on the captured image and fitting of three-dimensional coordinates in a three-dimensional space.

Next, explanation is given regarding processing performed in the present embodiment with reference to the flowchart of FIG. 2. The information processing apparatus 1 according to the present embodiment has a similar configuration to that of the first embodiment, and explanation is given below regarding points of difference.

Step S201 is performed similarly to in the first embodiment. In step S202 and step S203, a deterioration degree for each model edge feature is calculated and held similarly to in the first embodiment, and in addition, a deterioration degree for each surface of the three-dimensional model is calculated and held, similarly to in the second embodiment. Step S204 is performed similarly to in the second embodiment. In step S205, the feature extraction unit 104 extracts an image edge feature from the captured image, similarly to in the first embodiment, and in addition extracts a measurement feature (a three-dimensional point), similarly to in the second embodiment.

Below, explanation is given in detail of the processing in step S206, with reference to the flowchart of FIG. 6. The processing of step S606 and step S607 is similar to that of the first embodiment, and the explanation is omitted. In step S601, the matching unit 107 performs initialization processing similarly to in the first and second embodiments.

In step S602, the matching unit 107 performs association of each group of model edge features and each of group of image edge features, similarly to in the first embodiment. In addition, the matching unit 107 associates a measurement feature and a model feature (surface of the three-dimensional model), similarly to in the second embodiment.

In step S603, the matching unit 107 calculates an error vector and a coefficient matrix in order to solve a linear simultaneous equation. More specifically, the matching unit 107 performs both the processing explained in the first embodiment and the processing explained in the second embodiment. Equation (23) is obtained by combining the error vector and the coefficient matrix regarding an edge feature obtained in accordance with the first embodiment, and the error vector and the coefficient matrix regarding an edge feature obtained in accordance with the second embodiment.

[EQUATION 23]

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_2 \frac{\partial v_2}{\partial s_1} & \sin\theta_2 \frac{\partial u_2}{\partial s_2} - \cos\theta_2 \frac{\partial v_2}{\partial s_2} & \cdots & \sin\theta_2 \frac{\partial u_2}{\partial s_6} - \cos\theta_2 \frac{\partial v_2}{\partial s_6} \\ \vdots & \vdots & \ddots & \vdots \\ a_1 \frac{\partial x_1}{\partial s_1} + b_1 \frac{\partial y_1}{\partial s_1} + c_1 \frac{\partial z_1}{\partial s_1} & a_1 \frac{\partial x_1}{\partial s_2} + b_1 \frac{\partial y_1}{\partial s_2} + c_1 \frac{\partial z_1}{\partial s_2} & \cdots & a_1 \frac{\partial x_1}{\partial s_6} + b_1 \frac{\partial y_1}{\partial s_6} + c_1 \frac{\partial z_1}{\partial s_6} \\ a_2 \frac{\partial x_2}{\partial s_1} + b_2 \frac{\partial y_2}{\partial s_1} + c_2 \frac{\partial z_2}{\partial s_1} & a_2 \frac{\partial x_2}{\partial s_2} + b_2 \frac{\partial y_2}{\partial s_2} + c_2 \frac{\partial z_2}{\partial s_2} & \cdots & a_2 \frac{\partial x_2}{\partial s_6} + b_2 \frac{\partial y_2}{\partial s_6} + c_2 \frac{\partial z_2}{\partial s_6} \\ \vdots & \vdots & & \vdots \end{bmatrix} \quad (23)$$

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1 - q_1 \\ e_2 - q_2 \\ \vdots \end{bmatrix}$$

In step S604, the matching unit 107 calculates a reliability for an image edge feature corresponding to a model edge feature, similarly to in the first embodiment, and also calculates a reliability for a measurement feature corresponding to a model feature, similarly to in the second embodiment. The calculated reliabilities are used as a weight for each image edge feature and measurement feature. In the following explanation, the weight matrix W is defined based on reliability, as in Equation (24).

[EQUATION 24]

$$W = \begin{bmatrix} w_{2d,1} & & & & 0 \\ & \ddots & & & \\ & & w_{2d,Na} & & \\ & & & w_{3d,1} & \\ & & & & \ddots \\ 0 & & & & w_{3d,Nb} \end{bmatrix} \quad (24)$$

The weight matrix W is a square matrix for which components other than diagonal elements are 0. The diagonal elements of the weight matrix W are a reliability $w_{2d,i}$ (i=1 to Na) for the image edge features, and a reliability $w_{3d,i}$ (i=1 to Nb) for the measurement features. Na is the total number of model edge features for which corresponding image edge features are detected, and Nb is the total number of model features corresponding to measurement features.

Similarly to in the first embodiment, Equation (11) is transformed by using the weight matrix W as in Equation (13). In step S605, the reliability calculation unit 105 obtains the correction value Δs by solving Equation (13) as in Equation (14).

As explained above, the position and orientation of the target object are estimated by the processing of steps S601-S607.

By the third embodiment explained above, the position and orientation of the target object are estimated by using both a measurement feature and an image edge feature while performing weighting with respect to the measurement feature considering degradation of the captured image in accordance with the bokeh, the blur, and the like. Accordingly, it is possible to improve the precision of estimation of the position and orientation of the target object.

[Fourth Embodiment]

Figure 14:
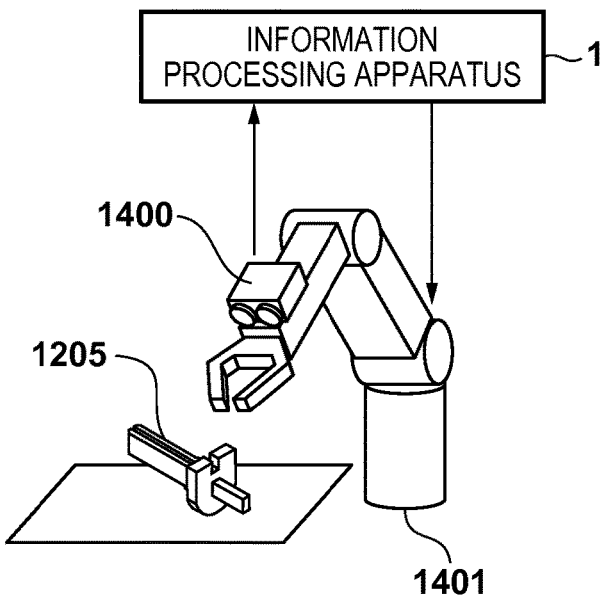
FIG. 14 is a view showing a configuration of a robot system according to a fourth embodiment.

In the fourth embodiment, an example of application of the information processing apparatus 1 according to the first to third embodiments is explained with reference to FIG. 14. More specifically, the information processing apparatus 1 estimates the position and orientation of the target object 1205 based on the captured image obtained by an image capturing apparatus 1400. An industrial robot 1401 operates the target object 1205 based on the estimated position and orientation of the target object 1205. As shown in FIG. 14, the robot system according to the present embodiment comprises the information processing apparatus 1, the image capturing apparatus 1400, and the robot 1401.

The robot 1401 is for example an industrial robot, and comprises a robot arm that has a movable shaft. Movement of the robot arm is controlled by a robot controller, and it is possible to cause an end effector to move to an instructed position. Thus the robot 1401 can perform an operation on an object, for example gripping the object or the like. The position of the target object 1205 which is placed on a work table can change. Accordingly, for the robot 1401 to perform operation on the target object 1205, it is necessary to estimate the current position and orientation of the target object 1205, and control movement of the robot arm based on this estimation. The robot controller may be provided by the robot 1401, or the robot 1401 may be connected to the robot controller.

The image capturing apparatus 1400 is a camera that captures two-dimensional images. As the image capturing apparatus 1400, it is possible to use an ordinary camera. The image capturing apparatus 1400 is placed at a position at which it is possible to capture the target object 1205. In an embodiment, the image capturing apparatus 1400 is provided on the end effector of the robot arm comprised by the robot 1401, i.e. on a hand that grips the object, or adjacent to the hand. The image capturing apparatus 1400 may be arranged at a position separated from the robot 1401.

As explained in the first to third embodiments, the information processing apparatus 1 estimates the position and orientation of the target object 1205 based on the captured image obtained from the image capturing apparatus 1400.

As necessary, the irradiation apparatus explained in the second embodiment may also be used. The position and orientation of the target object 1205 estimated by the information processing apparatus 1 is transmitted to the robot controller. The robot controller controls the position and orientation of the robot arm based on the obtained position and orientation of the target object 1205. Thus, the robot 1401 can perform operations, such as gripping or the like of the target object 1205.

As described above, the robot system according to the fourth embodiment can perform an operation with respect to the target object 1205 by estimating the position and orientation of the target object 1205, even if the position of the target object 1205 is not fixed.

[Fifth Embodiment]

In the first to fourth embodiments, the position and orientation of the target object is estimated. In the fifth embodiment, specification of a type of the target object is performed. The information processing apparatus 1 according to the fifth embodiment has a similar configuration to that of the first embodiment; explanation is given below of points of difference.

The deterioration degree calculation unit 101 and the deterioration degree holding unit 102 calculate and hold the deterioration degree. In the present embodiment, for example as explained in the first, eighth and ninth variations, the deterioration degree is calculated and held for each pixel. In the present embodiment, the deterioration degree is also calculated and held for each later-described projection image.

The feature extraction unit 104 extracts features from the captured image obtained by the image obtaining unit 103. In the present embodiment, the luminance value for each pixel is extracted as a feature.

The model holding unit 106 holds the model information for a plurality of comparison targets, which are objects that are compared to the target object. One piece of the model information is comprised by an image that includes an image of the comparison target, and an identifier that identifies the type of the comparison target. In other words, the model holding unit 106 performs image holding, and holds a plurality of images that include images of comparison targets. In the present embodiment, an image of a comparison target is a projection image obtained by projecting the three-dimensional model of the comparison target onto the captured image. The image of the comparison target may be a captured image obtained by capturing the comparison target. Also, the model holding unit 106 can hold a plurality of pieces of model information for one comparison target for cases where the relative position and orientation of the comparison target with respect to the image capturing apparatus differs.

The reliability calculation unit 105 calculates the reliability for each pixel of the projection image that the model holding unit 106 holds. In the present embodiment, the reliability calculation unit 105 calculates a statistic value, for example an average value, of the deterioration degree, from the deterioration degree for each pixel of the projection image. Similarly to the first embodiment, the reliability calculation unit 105 then uses a Tukey function to calculate the reliability of each pixel. As explained previously, a method of calculating the reliability is not particularly limited if the reliability becomes low to the extent that the deterioration degree is high. For example, configuration may be taken to calculate the reliability of each pixel by using the Tukey function and a predetermined threshold. Configuration may be taken to use the calculated statistic value to set a common reliability with respect to all pixel positions. As the statistic value, it is also possible to use a median value, a standard deviation, or the like.

The matching unit 107 specifies the type of the target object included in the captured image obtained by the image obtaining unit 103. More specifically, the matching unit 107 determines a similarity of the captured image obtained by the image obtaining unit 103 and the projection image that the model holding unit 106 holds. In the present embodiment, the matching unit 107 weights, in accordance with the reliability for each pixel position, the difference between the pixel value of the projection image and the pixel value of the captured image for each pixel position. The degree of matching between the image of the target object and the image of the comparison target is then calculated based on the weighted difference obtained for each pixel position. The thus obtained degree of matching is based on a difference with a corresponding feature of a comparison target image for each of a plurality of features of the image of the target object, which is weighted in accordance with the deterioration degree corresponding to the position at which the feature is extracted.

In one example, the matching unit 107 uses a normalized cross-correlation function shown in Equation (25) to calculate a similarity NCC between the luminance value obtained by the feature extraction unit 104 and the luminance value of the projection image that the model holding unit 106 holds. It is determined that the similarity is high to the extent that the value of NCC calculated in accordance with Equation (25) is close to 1.

[EQUATION 25]

$$NCC = \frac{\sum_{j=0}^{N-1} \sum_{i=0}^{M-1} (W(i,j)I(i,j)) \, T(i,j)}{\sqrt{\sum_{j=0}^{N-1} \sum_{i=0}^{M-1} (W(i,j)I(i,j))^2 \times \sum_{j=0}^{N-1} \sum_{i=0}^{M-1} T(i,j)^2}} \quad (25)$$

In Equation (25), i and j indicate a pixel position, and functions I and T respectively indicate the luminance value of the projection image that the model holding unit 106 holds and the luminance value obtained by the feature extraction unit 104. In addition, a function W indicates the reliability calculated by the reliability calculation unit 105.

The matching unit 107 calculates the NCC with respect to each the projection image that the model holding unit 106 holds. The matching unit 107 specifies the projection image for which the value of NCC is closest to 1. Finally, the matching unit 107 specifies the type of the target object by using the identifier associated with the specified projection image. The matching unit 107 can output information that indicates the type of the specified target object. If the value of NCC does not exceed a threshold, the matching unit 107 can determine that an object of a registered type is not present in the captured image.

Next, explanation is given of processing in the present embodiment, with reference to the flowchart of FIG. 2. The processing of step S201 is performed similarly to in the first embodiment. In steps S202 and S203, the deterioration degree calculation unit 101 and the deterioration degree holding unit 102 calculate and hold the deterioration degree as described above. The processing of step S204 is performed similarly to in the first embodiment.

In step S205, the feature extraction unit 104 extracts as a feature each pixel value on the captured image obtained in step S204. In step S206, as described above, the matching unit 107 uses the features extracted in step S205, the projection image that the model holding unit 106 holds, and reliabilities calculated by the reliability calculation unit 105 to perform recognition of the target object.

By the above processing, it is possible to specify the type of the target object. By applying the present embodiment, it is further possible to determine the position and orientation of the target object. For example, one piece of model information that the model holding unit 106 holds may be configured by a projection image, an identifier, and information indicating the relative position and orientation of the image capturing apparatus with respect to the comparison target. In such a case, it is possible for the matching unit 107 to use the information that indicates the relative position and orientation associated with the specified projection image to determine the position and orientation of the target object.

According to the fifth embodiment, it is possible to perform specification of the type of the target object at high precision by calculating the degree of matching between the captured image and the projection image, while performing weighting with respect to each pixel by considering degradation of the captured image in accordance with the bokeh and the blur, or the like.

[Tenth Variation]

In the fifth embodiment, recognition of the target object is performed based on the similarity between the captured image of the target object and a projection image that the model holding unit 106 holds. In the tenth variation, recognition of the target object is performed by using a similarity of SIFT features. The information processing apparatus 1 according to the fifth embodiment has a similar configuration to that of the first embodiment; explanation is given below of points of difference.

The feature extraction unit 104 extracts SIFT feature amounts from the captured image obtained by the image obtaining unit 103. For example, the feature extraction unit 104 can detect feature points (key points) from the captured image, and calculate a SIFT feature amount at each key point. A method of detecting key points and a method of calculating SIFT feature amounts are publicly known. As one example in the present embodiment, the method disclosed in Hironobu Fujiyoshi, "Local Feature Amounts for Generic Object Recognition (SIFT and HOG)" Information Processing Institute Research Report, CVIM 160, pp. 211-224, 2007 is used.

The model holding unit 106 holds the model information for the plurality of comparison targets. One piece of the model information is comprised by SIFT feature amounts extracted from the projection image obtained by projecting the three-dimensional model of the comparison target on the captured image, and an identifier that specifies the type of the comparison target. In the present embodiment, one piece of model information includes a plurality of SIFT feature amounts. Also, the model holding unit 106 can hold a plurality of pieces of model information for one comparison target for cases where the relative position and orientation of the comparison target with respect to the image capturing apparatus differs.

The matching unit 107 specifies a type of a target object included in the captured image obtained by the image obtaining unit 103. More specifically, the matching unit 107, first selects one piece of the model information that the model holding unit 106 holds, and then associates a SIFT feature amount included in the selected model information with a SIFT feature amount extracted by the feature extraction unit 104. A method of associating the SIFT feature amounts is publicly known, and as one example in the present embodiment, the method disclosed in Hironobu Fujiyoshi, "Local Feature Amounts for Generic Object Recognition (SIFT and HOG)" Information Processing Institute Research Report, CVIM 160, pp. 211-224, 2007 is used.

When performing association of SIFT feature amounts, it is possible to associate a SIFT feature amount that the model holding unit 106 holds and a SIFT feature amount extracted from the captured image obtained by the image obtaining unit 103, for which the distance is close. This associating can be performed independently of a pixel position of a key point. In the first to fifth embodiments, features whose positions are close are associated, but it is possible to use various methods as the method of associating the features in this way.

Next, the matching unit 107 obtains a reliability for associated SIFT feature amounts. In the present variation, similarly to in the fifth embodiment, the reliability calculation unit 105 calculates the reliability for each pixel of the projection image that the model holding unit 106 holds. The matching unit 107 obtains the reliability for a pixel of a key point corresponding to a SIFT feature amount extracted from the captured image from the reliability calculation unit 105. The matching unit 107 calculates, as a similarity R, the sum total of weighted distances for which obtained reliability is multiplied as a weight with the Euclidean distances between associated SIFT features.

The matching unit 107 performs the above described processing to calculate the similarity R for each piece of model information. The matching unit 107 then specifies the model information for which the similarity R becomes a minimum, and specifies the type of the target object in accordance with an identifier associated with the specified model information. The matching unit 107 can output information that indicates the type of the specified target object. In the present variation, similarly to in the fifth embodiment, it is possible to use the information that indicates the relative position and orientation associated with the specified model information to determine the position and orientation of the target object.

SIFT feature amounts are used in the present variation, but the type of the target object can be specified using other features extracted from the image. For example, it is possible to use an edge feature, a three-dimensional point calculated based on the captured image, or the like, as the feature.

[Sixth Embodiment]

Figure 15:
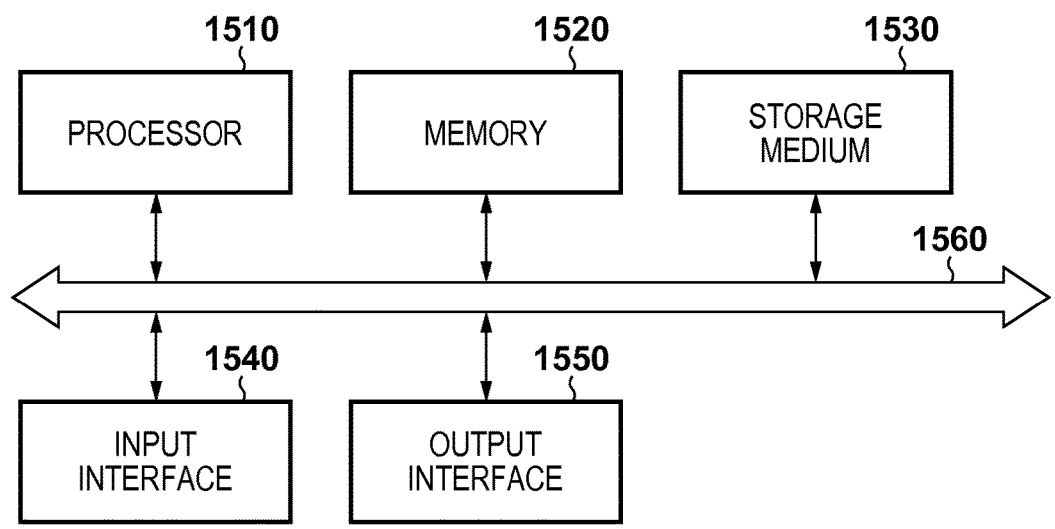
FIG. 15 is a view showing a configuration of a computer according to a sixth embodiment.

In the above described embodiment, each processing unit shown in, for example, FIG. 1 or the like is realized by dedicated hardware. However, a portion or all of the processing units may be realized by a computer. In the present embodiment, at least a portion of the processing according to each of the above described embodiments is executed by a computer. FIG. 15 is a view that shows a basic configuration of a computer. To execute the above described functions of each embodiment in the computer, each functional configuration may be expressed by a program and read by the computer. Thus, it is possible to realize each function of the above described embodiments by the computer. In such a case, each component in FIG. 15 may be caused to function by a function or a subroutine that the CPU executes.

In addition, the computer program is ordinarily stored in a non-transitory computer-readable storage medium, such as a CD-ROM. The computer program can be executed by setting the storage medium into a reading apparatus (such as a CD-ROM drive) that the computer has, and copying or installing it into the system. Accordingly, it is clear that the corresponding non-transitory computer-readable storage medium is within the scope of the present invention.

FIG. 15 is a view that shows a basic configuration of a computer. A processor 1510 in FIG. 15 is for example a CPU, and controls operation of the computer on the whole. A memory 1520 is for example a RAM, and temporarily stores a program, data, or the like. A non-transitory computer-readable storage medium 1530 is for example a hard disk or a CD-ROM, and stores a program and data, or the like for long periods. In the present embodiment, a program, which realizes the function of each unit and is stored in the storage medium 1530, is read into the memory 1520. The processor 1510 realizes the function of each unit by operating in accordance with the program in the memory 1520.

In FIG. 15, an input interface 1540 is an interface for obtaining information from an external apparatus, and is, for example, connected to an operation panel 112 or the like. Also an output interface 1550 is an interface for outputting information to an external apparatus, and is, for example, connected an LCD monitor 113, or the like. A bus 1560 connects each above described unit, and enables exchange of data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242301, filed Nov. 28, 2014, which is hereby incorporated by reference herein in its entirety.

What is claimed is:

1. An image processing apparatus comprising:
   one or more processors; and
   at least one memory coupled to the one or more processors, the at least one memory having instructions stored thereon which, when executed by the one or more processors, cause the image processing apparatus to:
   obtain a captured image of a target object that is captured by an image capturing apparatus capturing the target object, on which an illumination pattern is irradiated by an irradiation apparatus;
   obtain information that indicates a deterioration degree of the captured image, for a position in the captured image;
   extract a three-dimensional position of a point on an image of the target object, as a feature of the target object from the captured image based on the deterioration degree, a position of the irradiation apparatus, a position of the image capturing apparatus, and the illumination pattern;
   hold a three-dimensional model of the target object;
   associate the three-dimensional position of the point on the image of the target object and a three-dimensional position of a surface of the three-dimensional model that neighbors that three-dimensional position observed when the three-dimensional model is arranged in accordance with a predetermined position and orientation; and
   derive a position and orientation of the target object with respect to the image capturing apparatus by correcting the predetermined position and orientation based on a result of association.

2. The image processing apparatus according to claim 1, the at least one memory further having stored thereon instructions that, when executed by the one or more processors, cause the image processing apparatus to hold, in advance of being obtained, information that indicates an image deterioration degree for each position of a captured image that is captured by an image capturing apparatus.

3. The image processing apparatus according to claim 2, wherein, the information that indicates the deterioration degree is held in association with a position and orientation between the target object and the image capturing apparatus.

4. The image processing apparatus according to claim 2, the at least one memory further having stored thereon instructions that, when executed by the one or more processors, cause the image processing apparatus to hold information indicating a deterioration degree, of a captured image obtained by an image capturing apparatus by capturing the target object, at a position of each feature of an image of the target object in association with a feature that the three-dimensional model comprises that corresponds to the respective feature.

5. The image processing apparatus according to claim 1, the at least one memory further having stored thereon instructions that, when executed by the one or more processors, cause the image processing apparatus to correct the predetermined position and orientation to make a distance between the feature of the three-dimensional model and the feature of the target object small.

6. The image processing apparatus according to claim 1, wherein
   the feature is an edge feature, and
   wherein the at least one memory further has stored thereon instructions that, when executed by the one or more processors, cause the image processing apparatus to:

extract a plurality of edge features by performing edge detection processing on the captured image, and for each of a plurality of edges that the three-dimensional model has, calculate an image position obtained by projecting the edge on a projection image based on the predetermined position and orientation, and associates an image position of edge feature of an image of the target object in the captured image with an image position of an edge of the three-dimensional model on the projection image which neighbors the edge feature of the image of the target object.

7. The image processing apparatus according to claim 1, wherein the position and orientation of the target object with respect to the image capturing apparatus is derived by correcting the predetermined position and orientation based on the result of the associating and the deterioration degree corresponding to a position at which the feature was extracted.

8. The image processing apparatus according to claim 1, the at least one memory further having stored thereon instructions that, when executed by the one or more processors, cause the image processing apparatus to:

set an extraction parameter used to extract the feature from the captured image in accordance with the deterioration degree, and extract the feature from the captured image by using the extraction parameter.

9. The image processing apparatus according to claim 8, wherein the extraction parameter is set so that a feature is extracted by filtering processing that uses a filter, wherein the higher the deterioration degree is, the larger the size of the filter is.

10. The image processing apparatus according to claim 8, wherein the the extraction parameter is set so that a feature is extracted by filtering processing after resizing the captured image, wherein the higher the deterioration degree is, the smaller the captured image is resized.

11. The image processing apparatus according to claim 8, the at least one memory further having stored thereon instructions that, when executed by the one or more processors, cause the image processing apparatus to:

set a plurality of extraction parameters in accordance with the deterioration degree, and use each of the plurality of extraction parameters to extract a feature in accordance with filtering processing, and selects at least one extraction result from a plurality of extraction results in accordance with a response value of filtering processing.

12. The image processing apparatus according to claim 1, wherein the deterioration degree indicates at least one of a blur amount and a bokeh amount of the image.

13. The image processing apparatus according to claim 1, the at least one memory further having stored thereon instructions that, when executed by the one or more processors, cause the image processing apparatus to calculate the deterioration degree by using the three-dimensional model of the target object, based on an image capturing condition of the target object according to the image capturing apparatus.

14. The image processing apparatus according to claim 1, the at least one memory further having stored thereon instructions that, when executed by the one or more processors, cause the image processing apparatus to calculate the deterioration degree based on a captured image obtained by the image capturing apparatus capturing the target object.

15. The image processing apparatus according to claim 1, the at least one memory further having stored thereon instructions that, when executed by the one or more processors, cause the image processing apparatus to estimate a captured image obtained by the image capturing apparatus capturing the target object using the three-dimensional model of the target object based on an image capturing condition of the target object according to the image capturing apparatus, and calculating the deterioration degree based on the estimated image.

16. The image processing apparatus according to claim 1, the at least one memory further having stored thereon instructions that, when executed by the one or more processors, cause the image processing apparatus to obtain the captured image by capturing the target object.

17. The image processing apparatus according to claim 1, further comprising:

the image capturing apparatus configured to obtain the captured image by capturing the target object; and a robot arm comprising a movable shaft, wherein the at least one memory further has stored thereon instructions that, when executed by the one or more processors, cause the image processing apparatus to control a position and orientation of the robot arm in accordance with the derived position and orientation of the target object.

18. An image processing method comprising:

obtaining a captured image of a target object that is captured by an image capturing apparatus capturing the target object, on which an illumination pattern is irradiated by an irradiation apparatus;

obtaining information that indicates a deterioration degree of the captured image, for a position in the captured image;

extracting a three-dimensional position of a point on an image of the target object, as a feature of the target object from the captured image based on the deterioration degree, a position of the irradiation apparatus, a position of the image capturing apparatus, and the illumination pattern;

holding a three-dimensional model of the target object;

associating the three-dimensional position of the point on the image of the target object and a three-dimensional position of a surface of the three-dimensional model that neighbors that three-dimensional position observed when the three-dimensional model is arranged in accordance with a predetermined position and orientation; and deriving a position and orientation of the target object with respect to the image capturing apparatus by correcting the predetermined position and orientation based on a result of the associating.

19. A non-transitory computer-readable medium storing a program thereon, wherein the program is configured to cause a computer to:

obtain a captured image of a target object that is captured by an image capturing apparatus capturing the target object, on which an illumination pattern is irradiated by an irradiation apparatus;

obtain information that indicates a deterioration degree of the captured image, for a position in the captured image;

extract a three-dimensional position of a point on an image of the target object, as a feature of the target object from the captured image based on the deterioration degree, a position of the irradiation apparatus, a position of the image capturing apparatus, and the illumination pattern;

hold a three-dimensional model of the target object;

associate the three-dimensional position of the point on the image of the target object and a three-dimensional position of a surface of the three-dimensional model that neighbors that three-dimensional position observed when the three-dimensional model is arranged in accordance with a predetermined position and orientation; and derive a position and orientation of the target object with respect to the image capturing apparatus by correcting the predetermined position and orientation based on a result of association.

* * * * *